US008491375B2

(12) United States Patent
Low

(10) Patent No.: US 8,491,375 B2
(45) Date of Patent: Jul. 23, 2013

(54) GAMING DEVICE AND METHOD PROVIDING CALCULATED REEL SYMBOL EVALUATION

(75) Inventor: Michael Neil Low, Sparks, NV (US)

(73) Assignee: IGT, Reno, NV (US)

( * ) Notice: Subject to any disclaimer, the term of this patent is extended or adjusted under 35 U.S.C. 154(b) by 165 days.

(21) Appl. No.: 13/028,822

(22) Filed: Feb. 16, 2011

(65) Prior Publication Data

US 2011/0136564 A1 Jun. 9, 2011

Related U.S. Application Data

(62) Division of application No. 11/463,145, filed on Aug. 8, 2006, now Pat. No. 7,909,690.

(51) Int. Cl.
*A63F 9/24* (2006.01)
*A63F 13/00* (2006.01)

(52) U.S. Cl.
USPC .................. 463/20; 463/16; 463/17; 463/18; 463/19

(58) Field of Classification Search
USPC ...................................................... 463/16–20
See application file for complete search history.

(56) References Cited

U.S. PATENT DOCUMENTS 3,082,294 A 3/1963 Dean
3,533,629 A 10/1970 Raven
3,580,581 A 5/1971 Raven
3,639,736 A 2/1972 Sutherland
3,680,077 A 7/1972 Hoberecht
3,728,480 A 4/1973 Baer
3,770,269 A 11/1973 Elder
3,819,186 A 6/1974 Hinterstocker
3,822,363 A 7/1974 Moyer et al.
3,874,669 A 4/1975 Ariano et al.
4,095,795 A 6/1978 Saxton et al.
4,448,419 A 5/1984 Telnaes
4,508,345 A 4/1985 Okada
4,515,366 A 5/1985 Hamano
4,560,161 A 12/1985 Hamano (Continued)

FOREIGN PATENT DOCUMENTS

EP 0984408 A2 3/2000
WO WO 9732285 9/1997
WO WO 00/66235 11/2000
WO WO 00/76606 A1 12/2000
WO WO 2005/009560 3/2005

OTHER PUBLICATIONS

Bueschel, Richard M., Lemons, Cherries and Bell-Fruit-Gum, Nov. 1995, Royal Bell Books, "Bally Reel Dice," p. 249 (3 pages).*

(Continued)

*Primary Examiner* — Arthur O. Hall
*Assistant Examiner* — Jasson Yoo
(74) *Attorney, Agent, or Firm* — Neal, Gerber & Eisenberg LLP

(57) ABSTRACT

A gaming device having at least one target reel having target values, a plurality of value reels each having accumulative values, and a processor programmed to cause a spin of the target reel and value reels, accumulate the accumulative values generated on the value reels to form a cumulative value, compare the cumulative value to a designated one of the generated target values on the target reel, and provide an award to a player if the cumulative value meets a predefined mathematical threshold with respect to the designated one of the target values.

17 Claims, 13 Drawing Sheets

U.S. PATENT DOCUMENTS

| | | | |
|---|---|---|---|
| 4,648,600 | A | 3/1987 | Olliges |
| 4,695,053 | A | 9/1987 | Vazquez, Jr. et al. |
| 4,712,799 | A | 12/1987 | Fraley |
| 4,790,537 | A | 12/1988 | Smyth et al. |
| 4,836,546 | A | 6/1989 | DiRe et al. |
| 4,838,552 | A | 6/1989 | Hagiwara |
| 4,926,327 | A | 5/1990 | Sidley |
| 4,991,848 | A | 2/1991 | Greenwood et al. |
| 5,046,735 | A | 9/1991 | Hamano et al. |
| 5,092,598 | A | 3/1992 | Kamille |
| 5,102,134 | A | 4/1992 | Smyth |
| 5,152,529 | A | 10/1992 | Okada |
| 5,154,421 | A | 10/1992 | Hamano |
| 5,169,147 | A | 12/1992 | Hamano |
| 5,205,555 | A | 4/1993 | Hamano |
| 5,219,167 | A | 6/1993 | Hamano |
| 5,251,898 | A | 10/1993 | Dickenson et al. |
| 5,257,810 | A | 11/1993 | Schoor et al. |
| 5,308,065 | A | 5/1994 | Bridgeman et al. |
| 5,332,228 | A | 7/1994 | Schultz |
| 5,393,061 | A | 2/1995 | Manship et al. |
| 5,395,111 | A | 3/1995 | Inoue |
| 5,411,271 | A | 5/1995 | Mirando |
| 5,423,539 | A | 6/1995 | Nagao |
| 5,449,173 | A | 9/1995 | Thomas et al. |
| 5,456,465 | A | 10/1995 | Durham |
| 5,524,888 | A | 6/1996 | Heidel |
| 5,580,053 | A | 12/1996 | Crouch |
| 5,580,055 | A | 12/1996 | Hagiwara |
| 5,584,764 | A | 12/1996 | Inoue |
| 5,611,535 | A | 3/1997 | Tiberio |
| 5,655,965 | A | 8/1997 | Takemoto et al. |
| 5,697,843 | A | 12/1997 | Manship et al. |
| 5,725,428 | A | 3/1998 | Achmüller |
| 5,769,716 | A | 6/1998 | Saffari et al. |
| 5,807,172 | A | 9/1998 | Piechowiak |
| 5,833,537 | A | 11/1998 | Barrie |
| 5,836,586 | A | 11/1998 | Marks et al. |
| 5,882,261 | A | 3/1999 | Adams |
| 5,890,962 | A | 4/1999 | Takemoto |
| 5,984,781 | A | 11/1999 | Sunaga |
| 5,984,782 | A | 11/1999 | Inoue |
| 5,996,997 | A | 12/1999 | Kamille |
| 6,004,207 | A | 12/1999 | Wilson, Jr. et al. |
| 6,059,658 | A | 5/2000 | Mangano et al. |
| 6,062,980 | A | 5/2000 | Luciano |
| 6,089,977 | A | 7/2000 | Bennett |
| 6,093,102 | A | 7/2000 | Bennett |
| 6,095,921 | A | 8/2000 | Walker et al. |
| 6,120,377 | A | 9/2000 | McGinnis, Sr. et al. |
| 6,120,378 | A | 9/2000 | Moody et al. |
| 6,126,542 | A | 10/2000 | Fier |
| 6,142,873 | A | 11/2000 | Weiss et al. |
| 6,155,925 | A | 12/2000 | Giobbi et al. |
| 6,159,095 | A | 12/2000 | Frohm et al. |
| 6,174,233 | B1 | 1/2001 | Sunaga et al. |
| 6,174,235 | B1 | 1/2001 | Walker et al. |
| 6,186,894 | B1 | 2/2001 | Mayeroff |
| 6,190,254 | B1 | 2/2001 | Bennett |
| 6,200,217 | B1 | 3/2001 | Osawa |
| 6,224,483 | B1 | 5/2001 | Mayeroff |
| 6,227,971 | B1 | 5/2001 | Weiss |
| 6,231,442 | B1 | 5/2001 | Mayeroff |
| 6,241,607 | B1 | 6/2001 | Payne et al. |
| 6,251,013 | B1 | 6/2001 | Bennett |
| 6,261,178 | B1 | 7/2001 | Bennett |
| 6,270,412 | B1 | 8/2001 | Crawford et al. |
| 6,299,165 | B1 | 10/2001 | Nagano |
| 6,309,299 | B1 | 10/2001 | Weiss |
| 6,311,976 | B1 | 11/2001 | Yoseloff et al. |
| 6,319,124 | B1 | 11/2001 | Baerlocher et al. |
| 6,328,649 | B1 | 12/2001 | Randall et al. |
| 6,336,860 | B1 | 1/2002 | Webb |
| 6,375,570 | B1 | 4/2002 | Poole |
| 6,409,172 | B1 | 6/2002 | Vancura |
| 6,413,162 | B1 | 7/2002 | Baerlocher et al. |
| 6,419,579 | B1 | 7/2002 | Bennett |
| 6,428,412 | B1 | 8/2002 | Anderson et al. |
| 6,439,993 | B1 | 8/2002 | O'Halloran |
| 6,464,581 | B1 | 10/2002 | Yoseloff et al. |
| 6,494,454 | B2 | 12/2002 | Adams |
| 6,517,432 | B1 | 2/2003 | Jaffe |
| 6,547,242 | B1 | 4/2003 | Sugiyama et al. |
| 6,561,900 | B1 | 5/2003 | Baerlocher et al. |
| 6,561,902 | B1 | 5/2003 | Walker et al. |
| 6,565,433 | B1 | 5/2003 | Baerlocher et al. |
| 6,579,178 | B1 | 6/2003 | Walker et al. |
| 6,582,306 | B1 | 6/2003 | Kaminkow |
| 6,589,114 | B2 | 7/2003 | Rose |
| 6,599,192 | B1 | 7/2003 | Baerlocher et al. |
| 6,604,740 | B1 | 8/2003 | Singer et al. |
| 6,604,999 | B2 | 8/2003 | Ainsworth |
| 6,605,002 | B2 | 8/2003 | Baerlocher |
| 6,607,438 | B2 | 8/2003 | Baerlocher et al. |
| 6,616,142 | B2 | 9/2003 | Adams |
| 6,634,945 | B2 | 10/2003 | Glavich et al. |
| 6,690,133 | B2 | 2/2004 | Knorr et al. |
| 6,702,675 | B2 | 3/2004 | Poole et al. |
| 6,712,693 | B1 | 3/2004 | Hettinger |
| 6,719,631 | B1 | 4/2004 | Tulley et al. |
| 6,726,562 | B2 | 4/2004 | Vancura |
| 6,758,750 | B2 | 7/2004 | Baerlocher et al. |
| 6,786,818 | B1 | 9/2004 | Rothschild et al. |
| 6,793,578 | B2 | 9/2004 | Luccesi et al. |
| 6,796,900 | B2 | 9/2004 | Baerlocher et al. |
| 6,802,777 | B2 | 10/2004 | Seelig et al. |
| 6,811,402 | B1 | 11/2004 | Ritchie |
| 6,811,485 | B2 | 11/2004 | Kaminkow |
| 6,814,664 | B2 | 11/2004 | Baerlocher et al. |
| 6,852,030 | B2 | 2/2005 | Baerlocher et al. |
| 6,875,106 | B2 | 4/2005 | Weiss et al. |
| 6,896,615 | B2 | 5/2005 | Berman |
| 6,899,620 | B2 | 5/2005 | Kaminkow |
| 6,905,406 | B2 | 6/2005 | Kaminkow |
| 6,918,832 | B2 | 7/2005 | Baerlocher et al. |
| 6,960,134 | B2 | 11/2005 | Hartl et al. |
| 6,981,635 | B1 | 1/2006 | Hughs-Baird et al. |
| 7,001,274 | B2 | 2/2006 | Baerlocher et al. |
| 7,014,560 | B2 | 3/2006 | Glavich et al. |
| 7,033,270 | B2 | 4/2006 | Baerlocher et al. |
| 7,056,215 | B1 | 6/2006 | Olive |
| 7,097,175 | B2 | 8/2006 | Centrone |
| 7,108,264 | B2 | 9/2006 | Byme et al. |
| 7,108,603 | B2 | 9/2006 | Olive |
| 2003/0027622 | A1 * | 2/2003 | Osawa ............................ 463/20 |
| 2003/0036419 | A1 | 2/2003 | Baerlocher et al. |
| 2003/0036422 | A1 | 2/2003 | Baerlocher et al. |
| 2003/0036424 | A1 | 2/2003 | Baerlocher |
| 2003/0060257 | A1 | 3/2003 | Katz et al. |
| 2003/0060276 | A1 * | 3/2003 | Walker et al. ................... 463/25 |
| 2003/0060277 | A1 | 3/2003 | Webb et al. |
| 2003/0203752 | A1 | 10/2003 | Kaminkow et al. |
| 2003/0203753 | A1 | 10/2003 | Muir et al. |
| 2003/0216165 | A1 | 11/2003 | Singer et al. |
| 2004/0082378 | A1 | 4/2004 | Peterson et al. |
| 2004/0097286 | A1 | 5/2004 | Vancura |
| 2005/0009597 | A1 | 1/2005 | Daly |
| 2005/0096113 | A1 | 5/2005 | Gabuchian |
| 2005/0208994 | A1 | 9/2005 | Berman |
| 2006/0025196 | A1 | 2/2006 | Webb et al. |
| 2006/0135242 | A1 | 6/2006 | Tarantino |
| 2007/0021187 | A1 * | 1/2007 | Gauselmann ................... 463/20 |
| 2010/0203947 | A1 | 8/2010 | Walker et al. |

OTHER PUBLICATIONS

Collector's Treasury of Antique Slot Machines from Contemporary Advertising 1925-1950, edited by Peter Bach, Post-Era Books written in 1980 (6 pages).

Fey, Marshall, Slot Machines: A Pictorial History of the First 100 Years, Fifth Edition, pp. 169, 231, published 1983-1997 (3 pages).

* cited by examiner 16,18

Symbol

| Target | Pay | Target | Pay | Target | Pay | Target | Pay | Target | Pay | Target | Pay |
|---|---|---|---|---|---|---|---|---|---|---|---|
| 1 | 1x | 1 | 2x | 1 | 3x | 1 | 1x | 1 | 2x | 1 | 1x |
| 2 | 2x | 2 | 3x | 2 | 4x | 2 | 3x | 2 | 4x | 2 | 2x |
| 3 | 3x | 3 | 4x | 3 | 5x | 3 | 5x | 3 | 6x | 3 | 3x |
| 4 | 4x | 4 | 5x | 4 | 6x | 4 | 7x | 4 | 8x | 4 | 4x |
| 5 | 5x | 5 | 6x | 5 | 7x | 5 | 9x | 5 | 10x | 5 | 5x |
| 6 | 6x | 6 | 7x | 6 | 8x | 6 | 11x | 6 | 12x | 6 | 10x |
| 7 | 7x | 7 | 8x | 7 | 10x | 7 | 13x | 7 | 14x | 7 | 25x |
| 8 | 8x | 8 | 9x | 8 | 12x | 8 | 15x | 8 | 16x | 8 | 35x |
| 9 | 9x | 9 | 10x | | | 9 | 17x | 9 | 18x | 9 | 50x |
| 10 | 10x | 10 | 11x | | | 10 | 19x | 10 | 20x | 10 | 75x |
| | | | | | | 11 | 21x | 11 | 22x | 11 | 100x |
| | | | | | | 12 | 23x | 12 | 24x | 12 | 150x |
| | | | | | | | | | | 13 | 200x |
| | | | | | | | | | | 14 | 250x |
| | | | | | | | | | | 15 | 500x |
| | | | | | | | | | | 16 | 750x |
| | | | | | | | | | | 17 | 1000x |
| | | | | | | | | | | 18 | 5000x |

Bonus Points - One point accrued for each accrued count over target

Persistent Bonus - Activated automatically at 1000 points, doubles cumulative value along each line for next ten spins

FIG. 12

| Mathematical Threshold | Theme Example |
|---|---|
| Greater than or greater than or equal to target value. | Target symbol is a monster, accumulative values represent weapons, warriors, potions or other items that do damage to the monster and add up potentially to destroy the monster. |
| | Target symbol is a mountain climber, accumulative values represent steps up the mountain and add up potentially so that the climber reaches the top of the mountain. |
| Less than or Less than or equal to target value. | Target symbol is a weight lifter, accumulative values represent weights added to a bar and add up potentially so that total weight cannot be lifted. |
| Within a range of target value. | Target symbol is a motorcycle daredevil, accumulative values represent lengths of travel during jump, must accumulate to be within a certain range about target to land safely on ramp. |
| Hits target exactly. | Target symbol is a basketball hoop, accumulative values represent lengths of travel of basketball, must accumulate to target exactly for ball to fall through the hoop. |

GAMING DEVICE AND METHOD PROVIDING CALCULATED REEL SYMBOL EVALUATION

PRIORITY CLAIM

This application is a divisional of, and claims priority to and the benefit of, U.S. patent application Ser. No. 11/463,145, filed on Aug. 8, 2006, which is incorporated herein by reference in its entirety.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

The present disclosure relates generally to wagering games and more particularly to wagering games having rotating reels or wheels.

FIG. 1 illustrates a conventional apparatus and method for evaluating the reels of a slot machine. FIG. 1 shows a display device 16 or 18 of a gaming device discussed below in connection with FIGS. 2A and 2B. Display device 16 or 18 displays a plurality of reels 54*a* to 54*e* (referred to herein collectively as reels 54 or generally as reel 54). Display device 16 or 18 also shows a plurality of paylines 52*a* to 52*c* (referred to herein collectively as paylines 52 or generally as payline 52), along which the gaming device evaluates the reel symbols to determine if a winning symbol or combination of symbols has been generated.

In a conventional reel symbol evaluation, the winning symbol combinations must appear from left to right along the paylines 52. For example, if three heart symbols form a winning combination, the three heart symbols must appear on reels 54*a* to 54*c*. In the illustrated example, the three hearts appearing on reels 54*a* to 54*c* of payline 2 (52*b*) would yield a win to the player. However, in such conventional slot games, the three heart symbols appearing on reels 54*c* to 54*e* along payline 1 (52*a*) would not yield a win to the player in such a conventional game. It is also known in certain slot machines to pay for right to left winning symbol combinations, and for both left to right winning symbol combinations and right to left winning symbol combinations.

It is also known to stop the spinning of reels 54*a* to 54*e* beginning with left most reel 54*a* first, followed by the second reel 54*b*, the third reel 54*c*, the fourth reel 54*d* and finally the fifth reel 54*e*. By doing so, the gaming device can reveal to the player after the stoppage of the second reel 54*b* whether a particular payline has a potential to yield an award. For example, viewing FIG. 1 (which has left to right pays), the player knows that payline 1 will not yield an award after reel 54*b* comes to a stop (assuming the Diamond symbol, Double Bar symbol combination is not part of a winning combination of symbols). Also, the player knows after the stoppage of reel 54*b* that payline 3 will not yield a win (assuming the Apple symbol, 7 symbol combination is not part of a winning symbol combination). As shown, paylines 1 and 3 (54*a* and 54*c*) can become less fun and exciting to view after reel 54*b* or a subsequent reel stops spinning. In other words, players often know that they will not win after one or a plurality of reels stop regardless of the further reels. This can be very discouraging for players.

In the conventional method and apparatus for evaluating reel symbols shown in FIG. 1, the level of interaction between reels 54*a* and 54*e* is limited to the combination of symbols generated on those reels. While the symbols may be part of a common game theme, the symbols in the conventional method do not interact with one another other than to form a combination of symbols, which is evaluated to determine if the player wins an award.

A need therefore exists to provide a reel symbol evaluation method and apparatus that helps to maintain suspense throughout the entire stoppage of reels. Another need exists to increase the interaction between the symbols of different reels during and following reel spins, so as to increase the fun and excitement of the reel spins.

SUMMARY

Described herein are various embodiments of gaming devices and methods having different reel symbol evaluation methods. The various embodiments are advantageous in one aspect because the evaluations provide opportunities for wins along the paylines even if the symbols of the first reel(s) stopped do not form part of a conventional winning symbol combination, thereby enhancing the fun and excitement throughout the entire reel spin or until all of the reels have stopped. Also, the various embodiments increase the level of interaction between the symbols. For example, as shown below, the reel spin can be displayed in the form of a competition or contest in which one or more reels sets a goal or target, while the other reels try to meet or reach that target, or compete against the target.

It is believed that the evaluation embodiments increase excitement and enjoyment over traditional slot machine evaluation, without drastically changing the appearance of the reel spins. The displays are believed to be comfortable for experienced or accustomed players to view. The evaluation methods and apparatuses also lend themselves readily to associated probability and paytable development. Such probability and paytable development may have the same or similar payback percentage ranges, hit rates and high win potentials as with conventional slot machines. The embodiments are also readily configurable with slot machine variations, such as scatter pays, in-game bonusing, persistent bonusing, separately displayed bonus games, progressive pays, free spins, and other functions and features which have be associated with or employed in slot machines.

In a first set of embodiments, one of the reels is designated to be a target reel, while the remaining reels are designated to generate accumulative values, which are added or otherwise combined to form a cumulative value. The cumulative value is compared to the corresponding target value shown on the target reel after a reel spin. If the cumulative value meets a preset mathematical threshold or relationship with respect to the target value, the player wins an award. If the cumulative value does not meet the mathematical threshold or relationship with respect to the target value, the player does not receive an award.

In one embodiment, the target reel displays numbers or values. The accumulative reels also display numbers or values. For each payline in one embodiment, a target value is generated and displayed on the target reel, and cumulative numbers or values are generated and displayed on the accumulative reels. The symbols of this embodiment are thus numbers or other types of indicia signaling values. The values may be positive, negative or zero.

The mathematical threshold can take a variety of forms. In one example embodiment, the player wins along a particular payline if the cumulative value is greater than the target value. In another example embodiment the player wins along the payline if the target value is greater than or equal to the cumulative value. In a further example embodiment, the player wins along the payline if the cumulative value is less than the target value. In a further example embodiment, the player wins along the payline if the cumulative value is less than or equal to the target value. In another example embodiment, the player wins along the payline if the cumulative value is equal to (or substantially equal to) the targeted value. In a still further example embodiment, the player wins along the payline if the cumulative values do not equal the target value. In a still further example embodiment, the player wins along the payline if the cumulative value falls within a designated range of the target value.

In one embodiment, the paytable for such embodiments provides varying pays for different target values depending upon the type of mathematical threshold employed. For example, if the cumulative value must meet or exceed the target value, the paytable could pay more for meeting or exceeding a larger target value versus meeting or exceeding a smaller target value. In another example, if the mathematical threshold is at or below the target value, the paytable could pay more for meeting or staying below smaller target values versus larger ones.

In a second set of embodiments, symbols other than numbers or values are displayed on the reels. The symbols in one embodiment relate to a game theme. The target symbols are provided in a manner such that a value is also associated with the symbol. For example, if the game includes cherry symbols, a single target symbol can include three cherries to indicate that the value associated with the cherry symbol is three. In these embodiments, like symbols appearing along a corresponding payline to the target symbol are counted to form the cumulative value. That is, each accumulative symbol in essence has a value of one. The cumulative value can then be compared with the target value according to any of the suitable, mathematic thresholds discussed above. For example, if the target symbol is three cherries, and the mathematical threshold is to meet or exceed the target value, then at least three cherry symbols must appear on the accumulative reels along the associated payline. It is also contemplated that the accumulative symbols may include two or more of the target indicia (e.g., cherries) so that the accumulative symbol adds two or more points to the cumulative value. Here, for example, if the target value is three, and one accumulative symbol shows two cherries, while another accumulative reel along the same payline shows one cherry, then a meet or exceed mathematical threshold of meeting or exceeding the target value is met. In this embodiment, multiple symbols may be positioned at one or more of the symbol positions on the reels.

The paytable for this second set of embodiments can be made to be dependent upon one or both of the target value and the associated symbol. For example, satisfying the mathematical threshold for three double bar symbols can be configured to pay more than satisfying the mathematical threshold for three cherry symbols. In another example, satisfying the mathematical threshold for three double bars can pay more than for three cherries.

A third set of embodiments combines aspects of the two previously described sets of embodiments. In this set of embodiments, one or more target reels is used to designate a target symbol from a group of symbols along with an associated value. A plurality of accumulator reels are provided, which also generate symbols having associated values. Values of like symbols are accumulated to form a cumulative value. If the cumulative value associated with the accumulative symbols along the corresponding payline meets or satisfies a mathematical threshold with respect to the target value associated with the target symbol, the player wins an award. For example, if the target reel (or reels) determines that the target symbol is a cherry and determines that the target value associated with the cherry is ten, and if two accumulator reels each generate a cherry symbol, one of which has an associated value of four and the other which has an associated value of six, then the player would win an award if the mathematical threshold is that the cumulative value meet or exceed the target value. It should be appreciated that in alternative embodiments this evaluation can again be made along one payline or multiple paylines.

In this third set of embodiments, the target symbol and target value may be determined using two separate reels, for example, one reel determining the target symbol, the second reel determining the target value. The paytable for this third embodiment can be similar to the paytable for the second embodiment, wherein the pays vary based on at least one of the target symbol and the target value.

It should be appreciated that the present disclosure can be provided on dependent reels where the symbols displayed at multiple symbol positions in a column are on one reel (such as in most conventional slot machines). It should also be appreciated that independent or unisymbol reels can be employed where only one symbol at a symbol position is displayed on each reel. It should also be appreciated that the target reels and the accumulative reels may be positioned and activated in any suitable order (e.g., target reel first to spin stop target reel last to spin stop).

In a further alternative of any of the embodiments described herein, the game may be configured to provide bonus points, for example, when the cumulative value exceeds the target value. That is, if the cumulative value only has to meet the target value to satisfy the mathematic threshold, but the cumulative value surpasses the target value by, for example, three counts or points, the game can award the player a corresponding number of bonus points, such as three bonus points. Disclosed herein are paytables explaining the use of these bonus points, which in various embodiments are accumulated to provide bonus features, such as multipliers, adder symbols that add to each of the generated accumulative symbols, scatter pays, persistent bonuses, and other suitable functions.

The values associated with the accumulative symbols in any of the primary embodiments discussed herein may be positive, negative, zero or be provided in the form of a multiplier symbol, an adder symbol or any other suitable mathematical operation symbol. The multiplier in one example multiplies: (i) the sum of the remaining values along the payline; (ii) the value generated directly after the multiplier along the payline; or (iii) another designated combination of accumulative values. The adder symbol can, for example, add a preset value to each of the remaining values of the accumulative symbols. The persistent bonus can, for example, be obtained after a certain amount or time of game play, and provide the player a bonus, such as a multiplier, over multiple spins or plays.

The matching or competition aspect of the reel evaluation apparatus and method lends itself to improved reel symbol interaction and exciting visual displays. For example, when the mathematical threshold involves the cumulative value being greater than or equal to the target symbol, the target symbols can represent a monster, while the accumulative symbols represent weapons that damage or hurt the monster. If the values associated with the weapons equal the value associated with the target monster, in one embodiment the display device of the gaming device displays an exciting visual display in which the monster is destroyed. Other example game themes for this mathematical threshold and different mathematical thresholds are discussed in more detail below.

It should be appreciated that the present disclosure may be employed as a base or primary game on which a player is required to make a wager, or as a bonus or secondary game on which a player may or may not be required to place a wager.

It is therefore an advantage of the present disclosure to provide an improved wagering gaming device.

Another advantage of the present disclosure is to provide an improved reel symbol evaluation apparatus and method.

A further advantage of the present disclosure is to provide a reel symbol evaluation apparatus and method that facilitates competition-type game themes.

Another advantage of the present disclosure is to provide a slot machine game having a reel symbol evaluation apparatus and method that is relatively intuitive for a player to learn and follow.

A further advantage of the present disclosure is to provide a slot machine game having a reel symbol evaluation apparatus and method that is operable with persistent bonuses, bonuses occurring in the base slot game and separate bonus games.

A further advantage of the present disclosure is to provide a slot machine game having a reel symbol evaluation apparatus and method having an enhanced capability of being suspenseful over an entire reel spin (i.e., until all of the reels have stopped).

It should be understood that various changes and modifications to the presently preferred embodiments described herein will be apparent to those skilled in the art. Such changes and modifications can be made without departing from the spirit and scope of the present subject matter and without diminishing its intended advantages.

BRIEF DESCRIPTION OF THE FIGURES

FIG. 12 is a chart illustrating mathematical thresholds that can be used with the symbol evaluation apparatuses and methods described herein and an example game theme for each mathematical threshold.

DETAILED DESCRIPTION

The Gaming Device Generally

Figure 1:
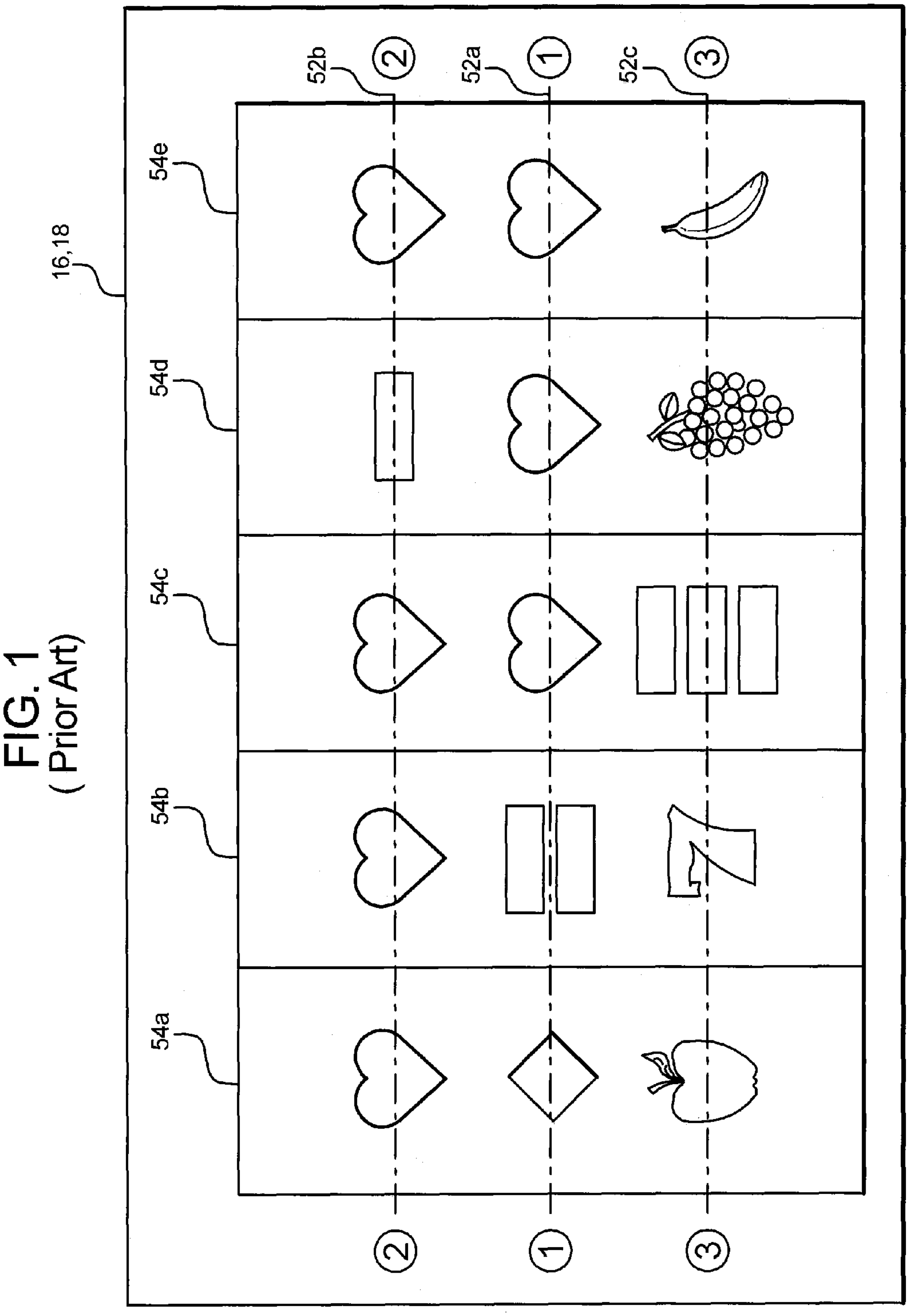
FIG. 1 (Prior Art)
FIG. 1 is an elevation view of a set of slot machine reels illustrating a conventional reel symbol evaluation apparatus and method.
Figure 2A:
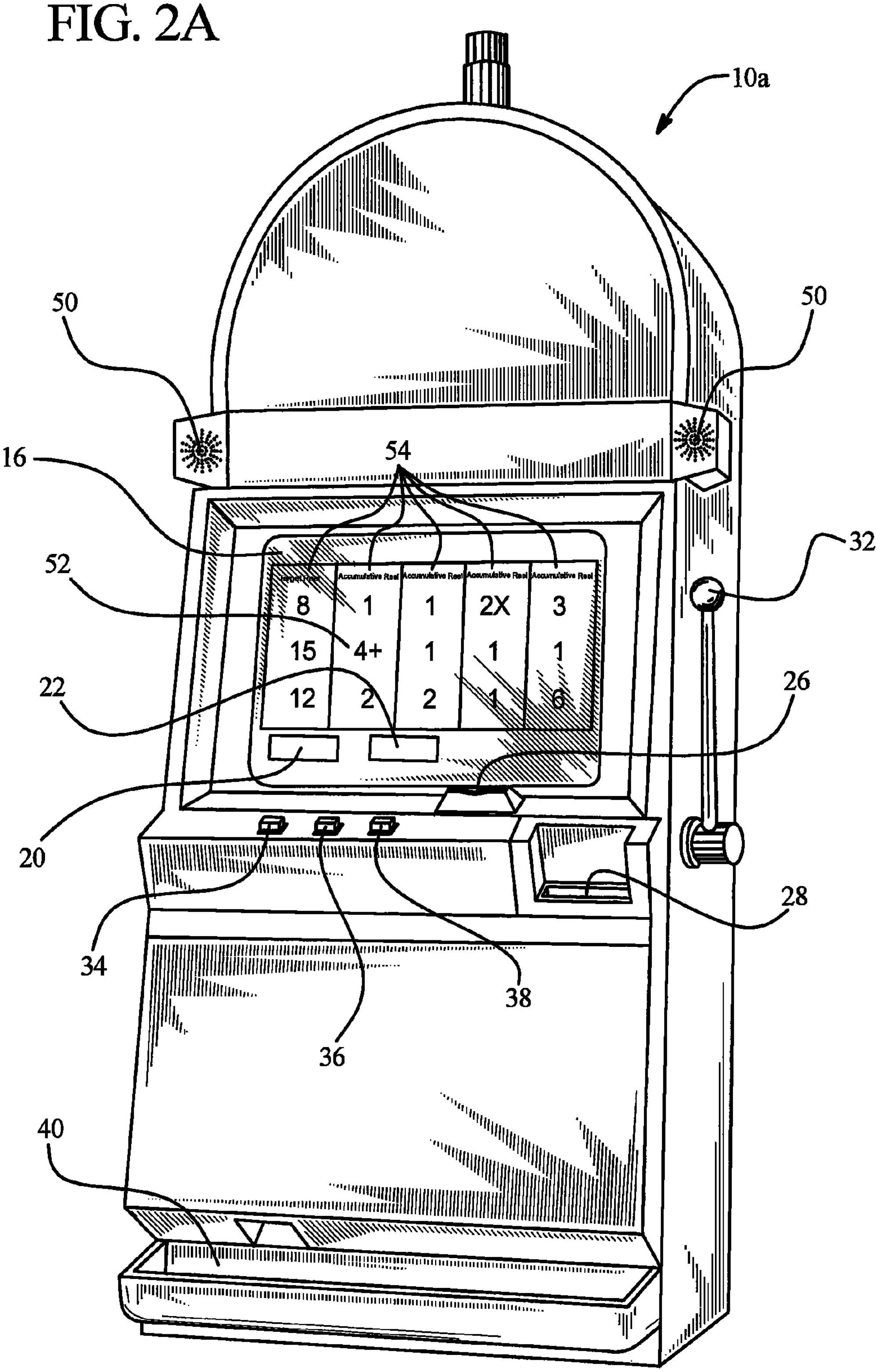
FIG. 2A is a front perspective view of one embodiment of a slot machine employing the reel symbol evaluation apparatus and method described herein.
Figure 2B:
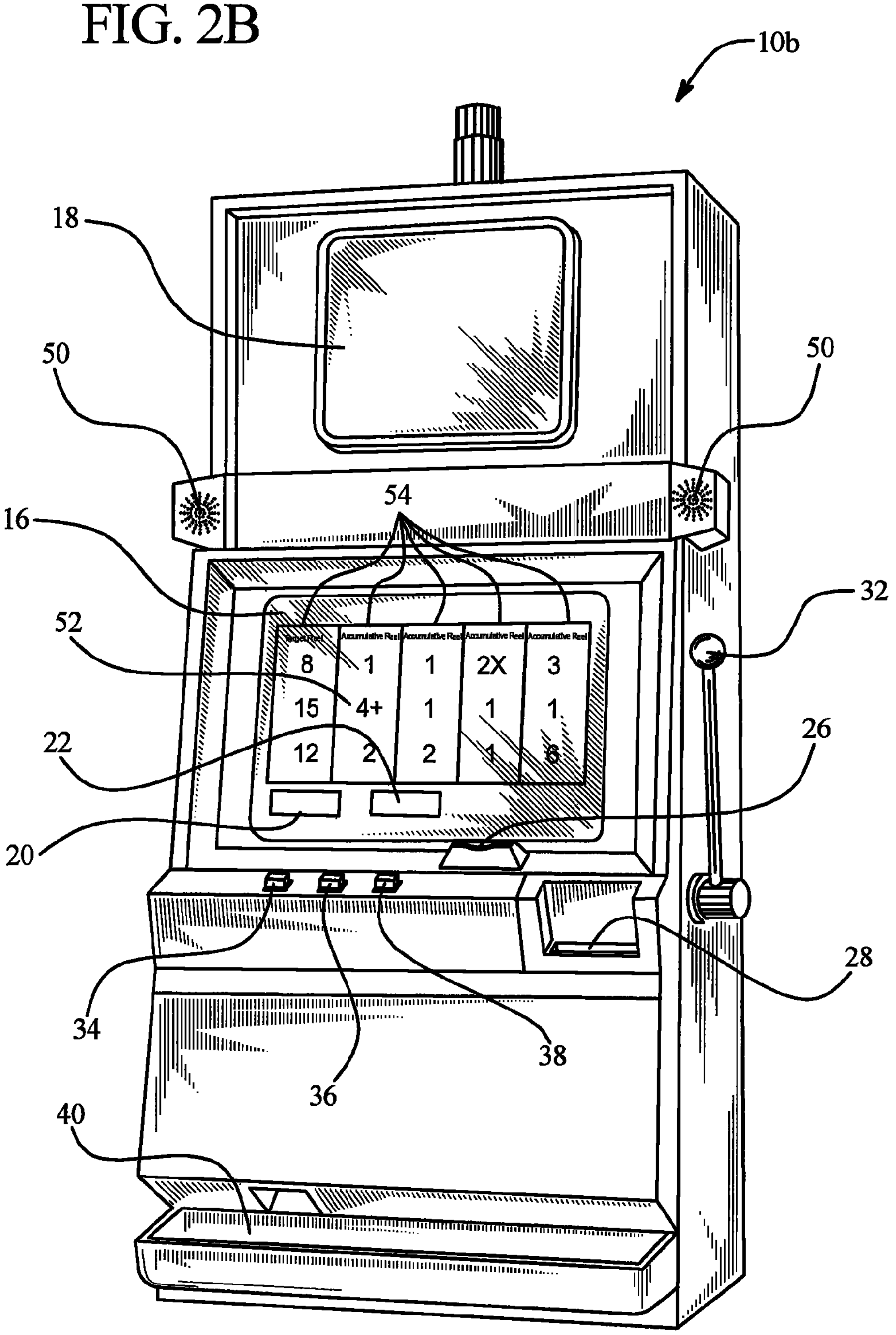
FIG. 2B is a front perspective view of another embodiment of a slot machine employing the reel symbol evaluation apparatus and method described herein.
Figure 3:
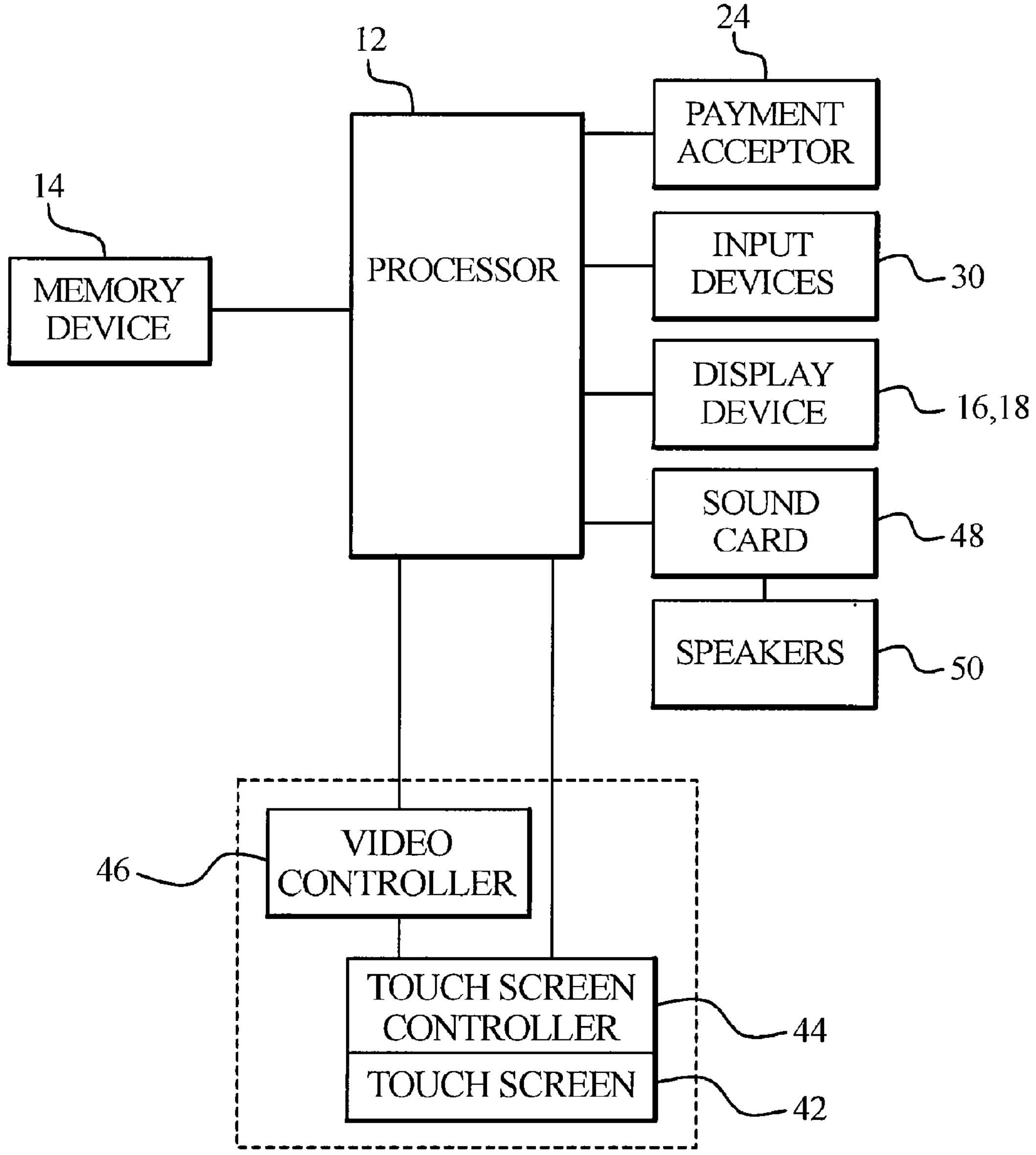
FIG. 3 is a schematic block diagram of one embodiment of an electronic configuration for one slot machine employing the reel symbol evaluation apparatus and method described herein.

The following examples describe a slot machine having different reel symbol evaluation methods and apparatuses. It is helpful to describe more general features of slot machines suitable for use with the reel symbol evaluation apparatuses and methods before addressing their specific features. Referring now to FIGS. 2A, 2B and 3, two alternative embodiments of a slot machine suitable for use with the reel symbol evaluation apparatus and method are illustrated as gaming device 10*a* and gaming device 10*b*, respectively. Gaming device 10*a* and/or gaming device 10*b* are generally referred to herein as gaming device 10.

In one embodiment, as illustrated in FIGS. 2A and 2B, gaming device 10 has a support structure, housing or cabinet that provides support for a plurality of displays, inputs, controls and other features of a conventional slot machine. Gaming device 10 is configured to be operated by a player standing or sitting. The gaming device may be positioned on a base or stand or be configured as a pub-style, table-top game (not shown), which a player can operate while sitting. As illustrated by the different configurations shown in FIGS. 2A and 2B, gaming device 10 can be constructed with varying cabinet and display configurations.

In one embodiment illustrated in FIG. 3, gaming device 10 includes at least one processor 12, such as a microprocessor, a microcontroller-based platform, a suitable integrated circuit or one or more application-specific integrated circuits (ASIC's). Processor 12 is in communication with or operable to access or to exchange signals with at least one data storage or memory device 14. In one embodiment, processor 12 and memory device 14 reside within the cabinet of gaming device 10. Memory device 14 stores program code and instructions, executable by processor 12, to control gaming device 10. Memory device 14 also stores other data, such as image data, event data, player input data, random or pseudo-random number generators, pay-table data or other operating data, information and applicable game rules that relate to the play of gaming device 10.

Memory device 14 includes random access memory ("RAM") which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including but not limited to, a suitable cartridge, disk or CD ROM. A player can use such a removable memory device in a desktop, a laptop personal computer, a personal digital assistant ("PDA") or other computerized platform. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, processor 12 of gaming device 10 controls one or more display devices 16, 18. Display devices 16, 18 are connected to or mounted to the cabinet of gaming device 10. The embodiment shown in FIG. 2A includes a central display device 16, which can display a primary or base game, e.g., the slot game employing the reel symbol evaluation apparatus and method described herein. Display device 16 may also display any suitable bonus or secondary game associated with the primary game as well as information relating to the primary and/or secondary game. The alternative embodiment shown in FIG. 2B includes a central display device 16 and an upper display device 18. Upper display device 18 may additionally or alternatively display the primary game, any suitable secondary game associated with the primary game and/or information relating to the primary or secondary game. These display devices may also serve as digital glass operable to advertise games or other aspects of the gaming establishment. In another embodiment, at least one display device may be a mobile display device, such as a PDA or tablet PC, that enables play of at least a portion of the primary or secondary game at a location remote from the gaming device.

Display devices 16 and 18 may include without limitation, a monitor, a television display, a plasma display, a liquid crystal display ("LCD"), a display based on light emitting diodes ("LED"), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, display device 16 or 18 includes a touchscreen 42 with an associated touchscreen controller 44. Display devices 16 and 18 may alternatively or additionally include mechanical or electromechanical components, such as reels 34 and wheels. The Display devices 16 and 18 may be of any suitable size, shape or configuration.

Display devices 16 and 18 of gaming device 10 are configured to display one or a plurality of games or other suitable images, symbols and indicia, such as any visual representation or exhibition of the movement of objects. Display devices 16 or 18 may have mechanical, virtual or video reels and wheels, dynamic lighting, video images and images of people, characters, places, things, faces of cards, tournament advertisements, promotions and the like.

In one embodiment, the symbols, images and indicia displayed on or by display devices 16 or 18 are in mechanical or electromechanical form. That is, display devices 16 or 18 may include any suitable electromechanical device, which moves one or more mechanical objects, such as one or more mechanical rotatable wheels or reels 34 that each display at least one image, symbol or indicia.

As illustrated in FIG. 3, in one embodiment, gaming device 10 includes at least one payment acceptor 24 in communication with processor 12. As seen in FIGS. 2A and 2B, payment acceptor 24 may include a coin slot 26 and a payment, note or bill acceptor 28, in each of which the player inserts money, coins or tokens. The player can place coins in the coin slot or paper money, ticket or voucher into the payment, note or bill acceptor. In other embodiments, devices such as readers or validators for credit cards, debit cards, data cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 2A, 2B and 3, in one embodiment gaming device 10 includes at least one input device 30 (generally) that communicates with processor 12. Input devices 30 can include any suitable apparatus that enables the player to produce an input signal read by processor 12. Input device 30, for example, can be a game activation device, such as a pull arm 32 or a play button 34. The player activates such input device to start a primary game or sequence of events in gaming device 10. Play button 34 can be any suitable play activator such as a bet one button, a max bet button or a repeat bet button. In one embodiment, upon appropriate funding, the gaming device begins the game play automatically. In another embodiment, upon the player engaging one of the play buttons, the gaming device automatically activates game play.

As seen in FIGS. 2A and 2B, in one embodiment gaming device 10 includes a credit display 20, which displays a player's current number of credits, cash, account balance or the equivalent. In one embodiment, gaming device 10 includes a paylines bet display 22*a*, a credits wagered per payline display 22*b* and a total credits wagered display 22*c*. Any of the input devices described herein may be touch screen input devices or be electromechanical as desired.

In the illustrated embodiment, the slot machine includes multiple paylines 52. Paylines 52 may be horizontal, vertical, circular, diagonal, angled or any combination thereof. Slot machine 10 displays at least one reel 54, such as three to five reels, in either electromechanical form with mechanical rotating reels or in video form with simulated reels and movement. In electromechanical form, stepper motors in an embodiment rotate and stop the reels at the randomly determined positions. In video form, reels 54 are simulated and made to look like they spin and stop through a video and/or animation display on display devices 16 and/or 18.

Gaming device 10 includes an increase paylines button 36*a* and a bet one button 36*b*. The player increases the number of paylines 52 (e.g., by one payline) each time the player presses the increase paylines button 36*a*. When the player reaches the maximum number of paylines 52 (e.g., nine paylines), the next press of the increase paylines button 36*a* returns the paylines selected back to the minimum number of wagered paylines (e.g., one payline). The player increases the wager per payline 52 (e.g., by one credit) each time the player presses the bet one button 36*b*. When the player reaches the maximum number of credits wagered per payline 52 (e.g., five credits per payline), the next press of the bet one button 36*b* returns the credits per payline selected back to the minimum number of credits per wagered payline (e.g., one).

In one embodiment, each time the player pushes the increase paylines button 36*a* the number of paylines shown in payline display 22*a* and total wager display 22*c* increases by one and the number of credits shown in credit display 20 decreases by one. Each time the player pushes the bet one button 36*b* the number of credits shown in credit display 20 decreases by one, and the number of credits shown in bet per payline display 22*b* and total wager display 22*c* increases by one.

Figure 5:
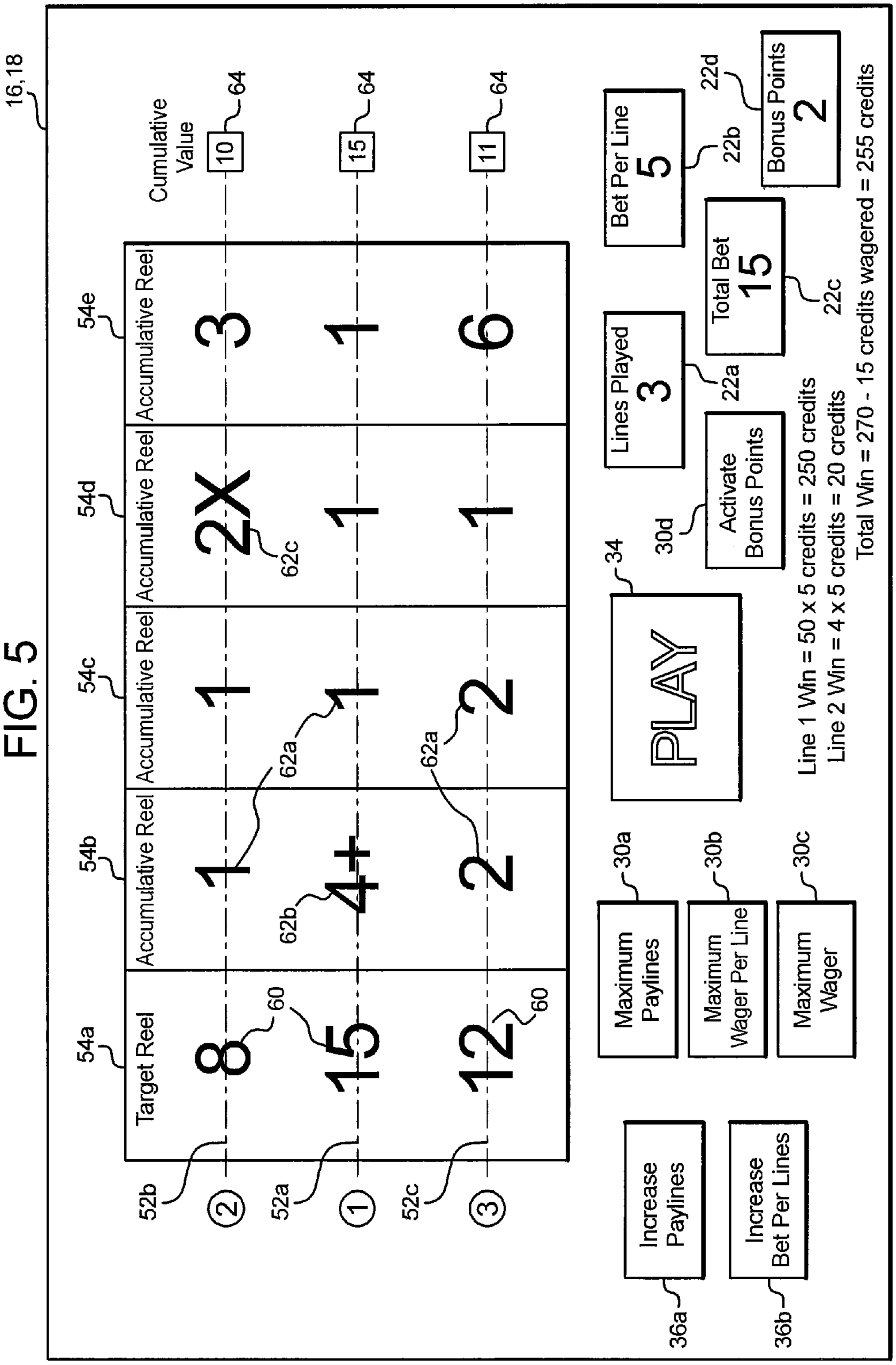
FIG. 5 is an elevation view of a display device of the gaming device illustrating one embodiment for the reel symbol evaluation apparatus and method.

Other wagering input devices 30 are provided, such as a maximum paylines button 30*a*, a maximum wager per payline button 30*b* and a max bet button 30*c* (see FIG. 5). The maximum paylines button 30*a* enables the player to bet the maximum number of paylines associated with gaming device 10 (e.g., nine paylines) with one button press. The maximum bet per payline button 30*b* enables the player to bet the maximum wager per payline associated with gaming device 10 (e.g., five credits per paylines) with one button press. The max bet button 30*c* enables the player to bet the maximum wager permitted for a game associated with gaming device 10 (e.g., forty-five credits). The maximum paylines button 30*a* enables the player to bet the maximum number of paylines associated with gaming device 10 (e.g., nine paylines) with one button press.

Gaming device 10 also includes a cashout button 38. The player pushes cashout button 38 to receive a cash payment or other suitable form of payment corresponding to the number of remaining credits shown in credit display 20. In one embodiment, when the player cashes out, the player receives coins or tokens in a coin payout tray 40. In another embodiment, when the player cashes out, the player receives another type of payout mechanism, such as a ticket or credit slip, which is redeemable by a cashier or is funded to the player's electronically recordable identification card.

As mentioned above and seen in FIG. 3, a touchscreen 42 or other type of touch-sensitive display overlay may be provided, which operates with a touchscreen controller 44 to allow the player to interact with the images on display device 16 or 18. Touchscreen 42 and touchscreen controller 44 operate with a video controller 46. A player can make decisions and input signals into gaming device 10 by touching touchscreen 42 at appropriate places.

Gaming device 10 in an embodiment includes a plurality of communication ports for enabling communication between processor 12 and external peripherals, such as a server or central determination computer, external video sources, expansion buses, game or other displays, an SCSI port or key pad.

In one embodiment processor 12 communicates with one or more sounds cards 48. Sound card 48 operates with at least one speaker 50 and/or other sound generating hardware and software to generate sounds, such as voice or music for the primary and/or secondary game or for other modes of gaming device 10, such as an attract mode. Gaming device 10 is configured to provide dynamic sounds that couple with attractive multimedia images displayed on display devices 16 and/or 18 for base or bonus play. During idle periods, gaming device 10 may display a sequence of audio and/or visual attraction messages to attract potential players to gaming device 10. The audio/video outputs also provide any desired customized information, such as game play and paytable information. To that end, processor 12 may operate multiple imbedded screens, such as a game play or paytable screen that the player can recall selectively, e.g., by touching indicia on touchscreen 42 corresponding to the game play or paytable screen.

In one embodiment, gaming device 10 includes a camera (not illustrated) that communicates with processor 12. The camera is positioned to acquire an image of a player playing gaming device 10 and/or the surrounding area of gaming device 10. The camera can selectively acquire still or moving (e.g., video) images in an analog, digital or other suitable format. Gaming device 10 can be further configured to display the camera images and the game in split-screen or picture-in-picture fashion on display device 16 and/or 18. For example, the camera may acquire an image of the player, after which that image is incorporated into the primary and/or secondary game as, e.g., a background image, game symbol or indicia.

Processor 12 enables the player to change the player's wager, add money to gaming device 10 and cash out from gaming device 10. Processor 12 responds to inquiries from the player, e.g., for paytable or game operation information. Processor 12 commands display devices 16 and 18 and speakers 50 to communicate the results of game play (e.g., actual outcome, rank of outcome, missed award opportunities and awards actually provided), bonus play, bonus pay and progressive pay.

Processor 12 also calculates any award that the player receives. The award may be in the form of a multiplier that multiplies the number of credits wagered, for example, the number of credits wagered on the payline. Many slot machines enable one to five credits to be wagered on any payline. If the award is a 50× multiplier, the player's ultimate award may range from fifty credits to two-hundred-fifty credits depending on the wager made for the winning payline. Processor 12 performs this calculation and updates credit display 20 accordingly.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game. The bonus game is implemented as a program code stored on one of the memory devices discussed above, which processor 12 executes.

In one embodiment, the triggering event or qualifying condition may be a selected outcome in the primary game or a particular arrangement of one or more indicia on a display device in the primary game. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given, number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 4:
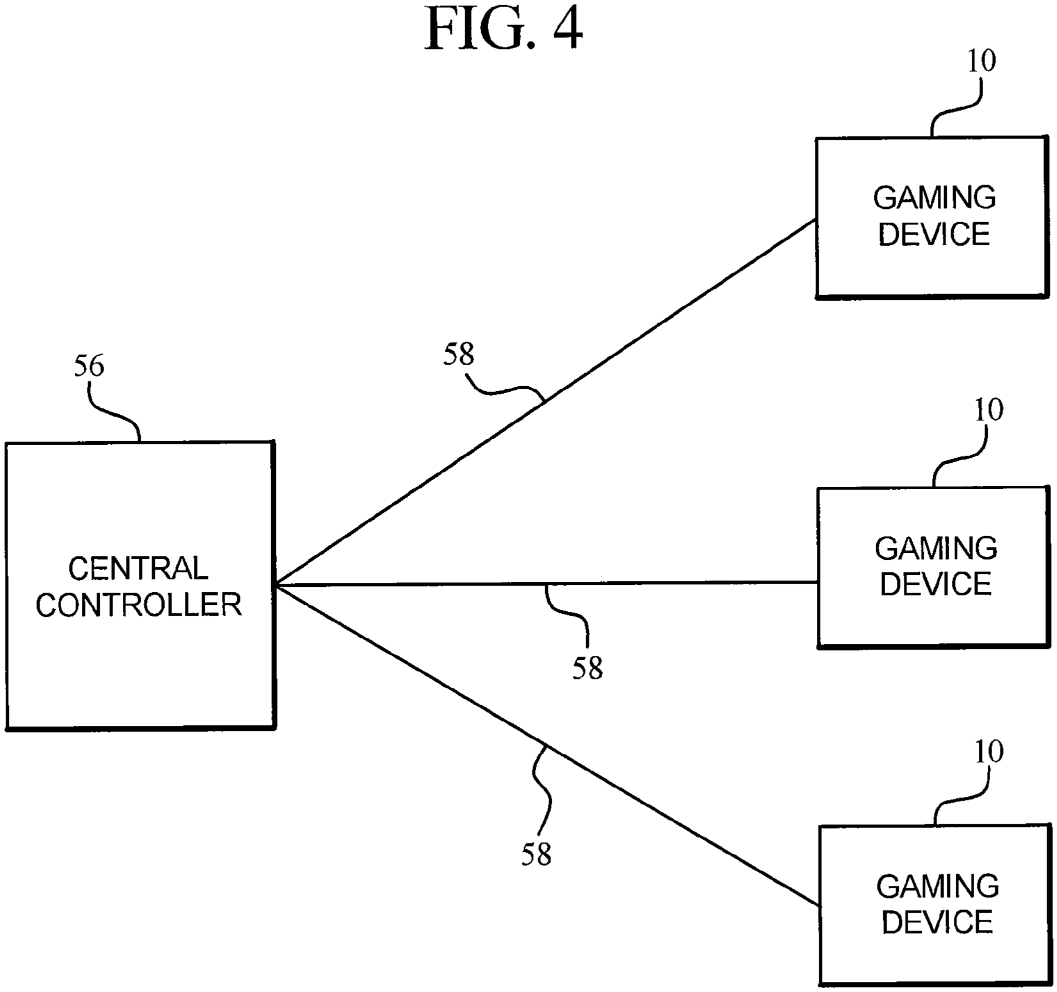
FIG. 4 is a schematic block diagram of one embodiment of a network configuration for a plurality of slot machines employing the reel symbol evaluation apparatus and method described herein.

As illustrated in FIG. 4, the present disclosure is operable with a plurality of the above described gaming devices 10, which can be linked to a data network via a remote communication link 58. Gaming devices 10 in the illustrated embodiment are connected via link 58 in a spoke-and-hub type fashion with a central server, central controller or remote host 56. More specifically, processor 12 of each gaming device facilitates transmission of signals between individual gaming devices 10 and central server 56. Central server 56 can operate a single cluster of machines 10 or multiple ones of such clusters.

In one such embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

Central server 56 in one embodiment is located physically separately from each of gaming devices 10. Central server 56 can be located out on the casino floor with gaming devices 10 or elsewhere in the casino. In a further alternative embodiment, central server 56 is located remotely from gaming devices 10. Indeed, when implemented via an internet, gaming devices 10 can be personal computers, link 58 can be the internet and central server 56 can be located in a different state or country.

The data network of link 58 is in one embodiment a local area network ("LAN"), in which gaming devices 10 of system 100 are in communication with an on-site central server 56. Gaming devices 10 may be located in one part of a casino or in clusters in different parts of the casino. The LAN may be implemented via conventional phone or other data transmission line, digital signal line ("DSL"), T-1 line, coaxial cable, fiber optic cable, wireless ("e.g., radio frequency") gateway or other suitable connection.

In another embodiment, the data network of link 58 is a wide area network ("WAN"), in which gaming devices 10 are in communication with at least one off-site central server 56. In this embodiment, the gaming devices may be located in a different part of the gaming establishment or within a different gaming establishment than the off-site central server. The WAN may be implemented via conventional phone or other data transmission line, DSL, T-1 line, coaxial cable, fiber optic cable, wireless ("e.g., radio frequency") gateway or other suitable connection.

In a further embodiment, the data network of link 58 is an internet or intranet. Here, the operation of gaming device 10 is viewed via at least one internet browser. Operation of gaming device 10 and accumulation of credits may be accomplished via a connection to the central server 56 (the internet/intranet server or webserver), such as a conventional phone or other data transmission line, DSL, T-1 line, coaxial cable, fiber optic cable, wireless ("e.g., radio frequency") gateway or other suitable connection. Here, players may access the slot game via an internet game page and from any location in which an internet connection or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications discussed herein, particularly if such communications are encrypted. Higher data transmission speeds may be useful for enhancing the sophistication and response of the display and interaction with the player.

Central server 56, via the LAN, WAN or internet network, is operable to build and distribute one or more progressive pool of funds. It is known in the art to apply a portion of each wager placed to initiate a base or primary game to such progressive pool. The pool builds until a triggering event causes the pool of funds to be distributed. The pool of funds can be distributed to a single machine or player or to multiple machines or players as desired by the game implementers.

For larger, multi-site linked progressive pools, central server 56 can: (i) communicate with or (ii) operate as a host site server, which is coupled to a plurality of local servers at a variety of mutually remote gaming sites. The host site server collects funds from and services gaming devices distributed throughout a number of properties at different geographical locations including, for example, different locations within a city or different cities within a state. In an embodiment, the host site server oversees the entire progressive gaming system and is the master processor for computing progressive jackpots. All participating gaming sites report to, and receive information from, the host site server. The host site server can be different than central server 56. Here, central server computer 56 is responsible for communicating data between gaming devices 10 and the host site server.

In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In one embodiment, central server 56 generates the base game outcomes (e.g., slot base game outcomes) for the constituent gaming devices 10. Here, processors 12 do not operate directly with an on-board random number generator to produce random outcomes at the individual gaming devices. Instead, central server 56 employs one or more random number generator to determine random outcomes for each of the gaming devices 10. Processor 12 receives the outcome generated randomly at central server 56 and displays the outcome to the player on display device 16, 18. For example, processor 12 receives a reel stop position outcome generated randomly at central server 56 and causes reels 54 to spin and stop at that reel stop position.

In one embodiment, each gaming device 10 linked to server 56 sends an outcome request over link 58 to central server 56. Central server 56 receives the game outcome requests, for example at the end of a countdown, and generates game outcomes for each of the requesting machines. Central server 56 also determines if a bonus award is generated for one or more of the gaming devices 10. When central server 56 determines that a gaming device 10 is eligible for a bonus payout and sends a message to processor 12 of that gaming device 10. The gaming device 10 can display a suitable bonus payout message to the player on display device 16 or 18 and/or provide a suitable audio message via speakers 50.

For base game outcome generation, central server 56 in one embodiment generates base game outcomes using probabilities and at least one random number generator. According to the probability data, it is more likely that central server will generate a lower paying result than a higher paying result. There is no limitation however on the amount of times that any particular outcome can be generated randomly. Over time, the outcomes should be generated in a frequency based on their associated weighted probabilities.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device. It should be appreciated that with the individual determination of outcomes, the level of success one machine experiences does not affect another machine's level of success. Memory device 14 stores one or more random number generators that operate with processor 12 to generate the outcomes randomly and at the gaming device 10. In one embodiment, any outcome has the same probability of being generated upon each play.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

How the generated or selected game outcomes are presented or displayed on the display devices 16 or 18 and/or speakers 50 can be determined by central server 56 or the individual game processors 12. Centralized production or control of base game outputs can assist a gaming establishment or other entity in maintaining appropriate records, controlling gaming, reducing and/or preventing cheating or electronic or other errors, reducing or eliminating win-loss volatility and the like.

As discussed herein, many gaming functions can be performed locally or centrally as desired by the system implementers. For example, player tracking and profiling can be maintained locally or centrally. If a ticketing or EZ Pay™ system is employed, it may operate with processors 12 or central server 56. Processor 12 and central server 56 may cooperate to provide audio and video displays in accordance with a theme of the gaming devices.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

In one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Reel Symbol Evaluation Apparatus and Method

Referring now to FIG. 5, one example of the reel symbol evaluation apparatus and method is illustrated on one of the display devices 16 or 18. The embodiment of FIG. 5 operates with the paytable shown in FIG. 6. FIG. 5 includes bet displays 22*a* to 22*c*, which display the number of paylines 52 played (e.g., three), the bet made per payline 52 (e.g., five credits per payline) and the total bet (e.g., fifteen credits), respectively. Increase paylines button 36*a* and a bet one button 36*b* enable the player to change the number of paylines 52 wagered and bet per payline 52, respectively. In one embodiment, increase paylines button 36*a* is operable to enable the player to wager consecutive paylines 52, e.g., paylines one and two out of three total paylines or wager non-consecutive paylines 52, e.g., paylines one and three out of the three paylines. In one embodiment, bet one button 36*b* is operable to enable the player to: (i) wager a same amount on each payline, for example, three credits out of five possible credits on paylines one, two and three; or (ii) wager different amounts on different paylines, for example, five credits, two credits and one credit, respectively, on paylines one, two and three.

FIG. 5 also displays play button 34 and activate bonus points button 30*d* and a bonus points meter 22*d*. Display device 16 and 18 also displays five reels 54*a* to 54*e* and three paylines 52*a* to 52*c*. Paylines one, two and three are marked on the left side of reels 54*a* to 54*e* (sometime referred to herein as reels 54). A total counted accumulative value discussed below for each payline is shown in cumulative valve boxes or windows 64 located at the right of reels 54.

In FIG. 5, reel 54*a* is set to be the target reel, while reels 54*b* to 54*e* are set to be the accumulative reels. Alternatively, any of the reels 54*a* to 54*e* may be set to be the target reel. For example, reel 54*e* may alternatively be the target reel. It should also be appreciated that the reels may spin and stop in any suitable order or sequence. As seen, the player has played all three lines and bet five credits per line for a total bet of fifteen credits. When the player presses play button 34, the reels spin and stop to show the values on reels 54*a* to 54*e*. The target value 60 on target reel 54*a* for payline 52*a* is fifteen. The target value 60 for payline 52*b* is eight. The target value 60 for payline 52*c* is twelve. The accumulative values appearing on accumulative reels 54*b* to 54*e* are shown in FIG. 5 to have various forms. In one embodiment, accumulative values 62*a* may be positive, negative or zero. In another embodiment, accumulative values 62*b* are adder values that are added to one, a plurality, or each of the remaining values before the remaining values are summed. In another embodiment, accumulative symbols 62*c* are multipliers that multiply one, a plurality, or each of the remaining accumulative values along the respective payline.

Payline 52*a* generates the following accumulative values: four+one, one and one. Here, the adder value four on reel 54*b* is added to each of the remaining values, making each value in reels 54*c* to 54*e* equal to five. Those values are added to form an overall cumulative value of fifteen. On payline 52*b*, the one, one and three values on reels 54*b*, 54*c* and 54*e*, respectively, are added together to form a value of five. That value is multiplied by the 2× multiplier on reel 54*d* to form a total cumulative value for payline 52*b* of ten. On payline 52*c*, the cumulative values 62*a* of two, two, one and six along reels 54*b* to 54*e*, respectively, are added together to form a cumulative value of eleven.

For ease of illustration, the mathematical threshold applied to each of the paylines 52*a* to 52*c* is to determine whether the cumulative value shown in meter 64 to the right of reel 54*e* for each payline is greater than or equal to the target value 60 generated randomly at reel 54*a*. For payline 52*a*, the cumulative value of fifteen shown to the right of reel 54*e* meets the target value of fifteen shown on reel 54*a*. The player therefore wins along payline 52*a*. For payline 52*b*, the total cumulative value of ten exceeds the target value 60 of eight. The player also wins along payline 52*b*. The cumulative value of eleven for line 52*c* does not meet the target value 60 of twelve shown on reel 54*a* for line 52*c*. Accordingly, the player does not win along line 52*c*.

In the illustrated embodiment, the two additional counts or points (ten-eight) for payline 52*b* are added to bonus points meter 22*d* as seen. In one embodiment there is a one to one relationship given to the difference between the cumulative value and the target value 60 and a number of bonus point provided to the player. Alternatively, a different mathematical relationship is applied to the difference between the cumulative value and the target value 60 and the bonus points awarded to the player. In different embodiments, the mathematical relationship applied is predetermined, randomly determined, determined based on the player's wager, determined based on the player's status (e.g., determined through a player tracking system), determined based on time, determined based on any side-bets placed, determined by the central controller, determined by the gaming device processor or determined based on any other suitable method.

In one embodiment, the accumulative values on a plurality of the accumulative reels are the same. In another embodiment, the accumulative values on each of the accumulative reels are the same. In one embodiment, the accumulative values on a plurality of the accumulative reels are different. In another embodiment, the accumulative values on each of the accumulative reels are different. In different embodiments, the accumulative values on the accumulative reels are predetermined, randomly determined, determined based on the player's wager, determined based on the player's status (e.g., determined through a player tracking system), determined based on time, determined based on any side-bets placed, determined by the central controller, determined by the gaming device processor or determined based on any other suitable method.

In one embodiment, the target values on a plurality of the target reels are the same. In another embodiment, the target values on each target reel are the same. In one embodiment, the target values on a plurality of the target reels are different. In another embodiment, the target values on each of the target reels are different. In different embodiments, the target values on the target reels are predetermined, randomly determined, determined based on the player's wager, determined based on the player's status (e.g., determined through a player tracking system), determined based on time, determined based on any side-bets placed, determined by the central controller, determined by the gaming device processor or determined based on any other suitable method.

Figure 6:
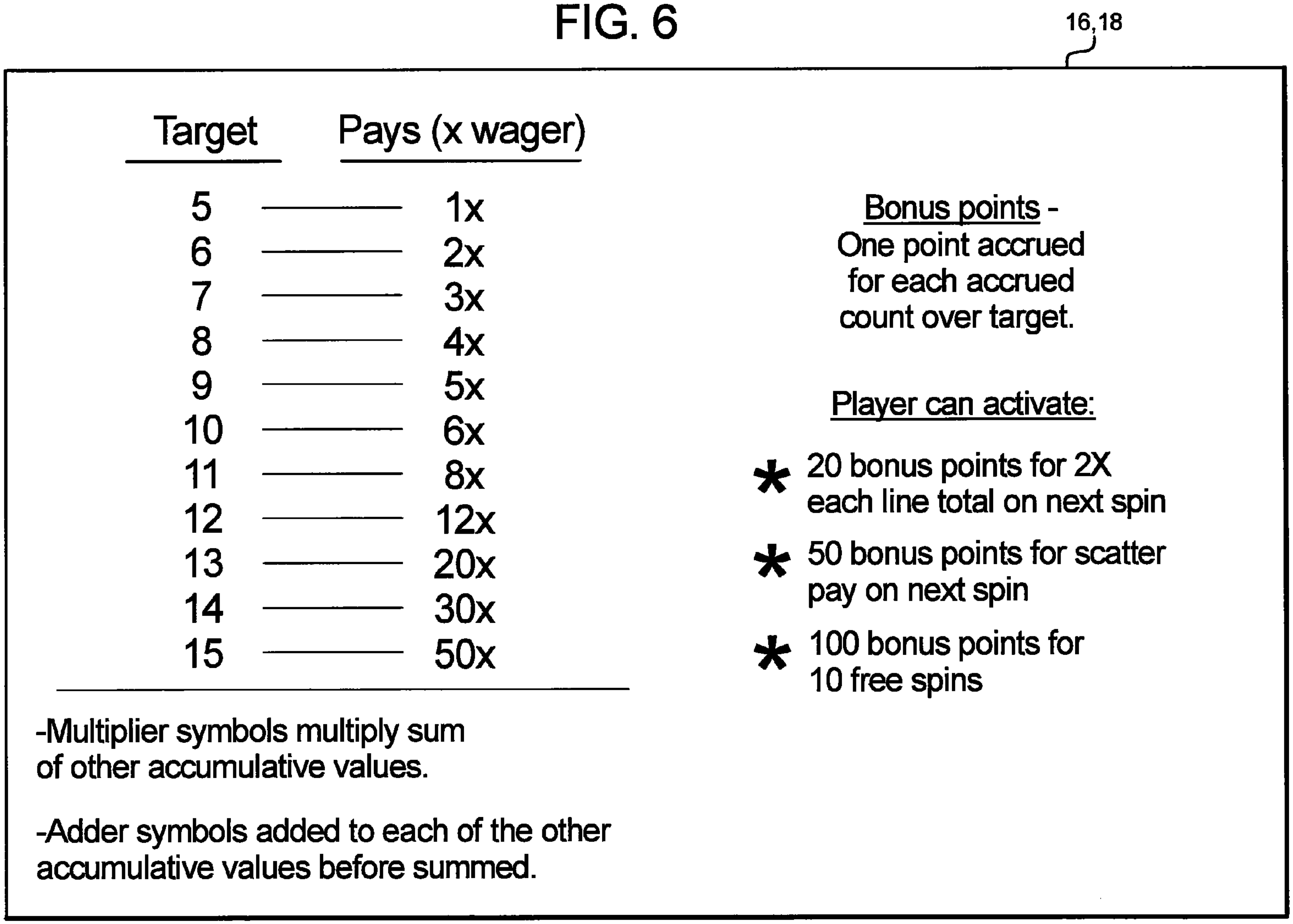
FIG. 6 is an elevation view of a display device of the gaming device illustrating one embodiment of a paytable for the reel symbol evaluation apparatus and method shown in FIG. 5.

FIG. 6 shows a paytable for the embodiment discussed in connection with FIG. 5. The paytable of FIG. 6 illustrates that the payouts increase as the target values increase. According to the paytable of FIG. 6 and as seen at the bottom of the screen shown in FIG. 5, the player wins fifty times the wager (five credits) along payline 52*c* for matching the target value of fifteen. The player wins four times the wager of five credits on payline 52*b* for exceeding the target value of eight. The player wins 270 credits (i.e., 250+20) less the fifteen credits wagered for a total win of two-hundred-fifty-five credits. Although not illustrated, display device 16 or 18 in FIG. 5 can additionally include a credit meter 20, which tallies the player's total credits on the gaming machine including the win of two-hundred-fifty-five credits.

The paytable of FIG. 6 provides additional information concerning this first illustrated example embodiment. The paytable informs the player about the bonus points shown in meter 22*d* of FIG. 5. Here, the paytable states that the player accrues one bonus point for each count of the cumulative value over its respective target value. Paytable also highlights that upon accruing 20 bonus points, the player can select the activate bonus points input 30*d* on display device 16 or 18 of FIG. 5 to obtain a 2× multiplier (multiplying the respective cumulative value) on each played line of the next spin. Alternatively, player can wait until fifty bonus points are accrued to achieve a scatter pay on the next spin of the reels. The player can alternatively wait until accruing one hundred bonus points before touching the activate button 30*d*, after which the player then obtains ten free spins. It should be appreciated that these are example embodiments and that any suitable bonus awards or functions could be employed in accordance with the present disclosure.

In one bonus embodiment, a bonus award or a bonus game (where the player can win a bonus award) is provided to the player if the cumulative value matches exactly the target value (i.e., does not exceed the target value). In other alternatives, the bonus award or bonus game is provided if the cumulative value exceeds the target value by a suitable designated amount. In further alternative embodiments, an award (or alternatively a bonus award) is provided based on how much the cumulative value exceeds the target value.

Various embodiments described herein can be operated in a scatter type arrangement. In one scatter pay type embodiment, processor 12 selects the highest cumulative value and uses that value for comparing each of the target values. In an alternative scatter pay embodiment, the cumulative values of two different paylines are combined and compared against one or more of the target values. In another alternative scatter pay embodiment, the cumulative values of each of the paylines is combined and compared against one or more or all of the target values. Other suitable scatter pay type or non-payline type embodiments may be employed in accordance with the present disclosure.

It should be appreciated that the present disclosure provides a gaming device and method which enables the player to win even if one or more of the reels generate blanks because the sum of the values on the other reels can meet the threshold. Thus, if one of the accumulative value reels generates a blank or blank symbol, the player still knows that they have a chance to win. In fact, depending upon the values of the target reels and the values of the accumulative reels, the player may have a chance to win until the last reel is stopped. The paytables and values can be adjusted in any suitable manner and may be adjusted to require certain numbers of symbols to be generated. It should also be appreciated that the values on the reels can be arranged so that many wins are based on the last reel to stop.

In one alternative embodiment, the target reel is in another suitable position such as on the right side or such or the last reel to stop. In this alternative embodiment, the target is displayed after the values are displayed. Thus, the player does not know whether there is a win until the target reel stops. In different embodiments, which reel is designated the target is predetermined, randomly determined, determined based on the player's wager, determined based on the player's status (e.g., determined through a player tracking system), determined based on time, determined based on any side-bets placed, determined by the central controller, determined by the gaming device processor or determined based on any other suitable method.

Figure 7:
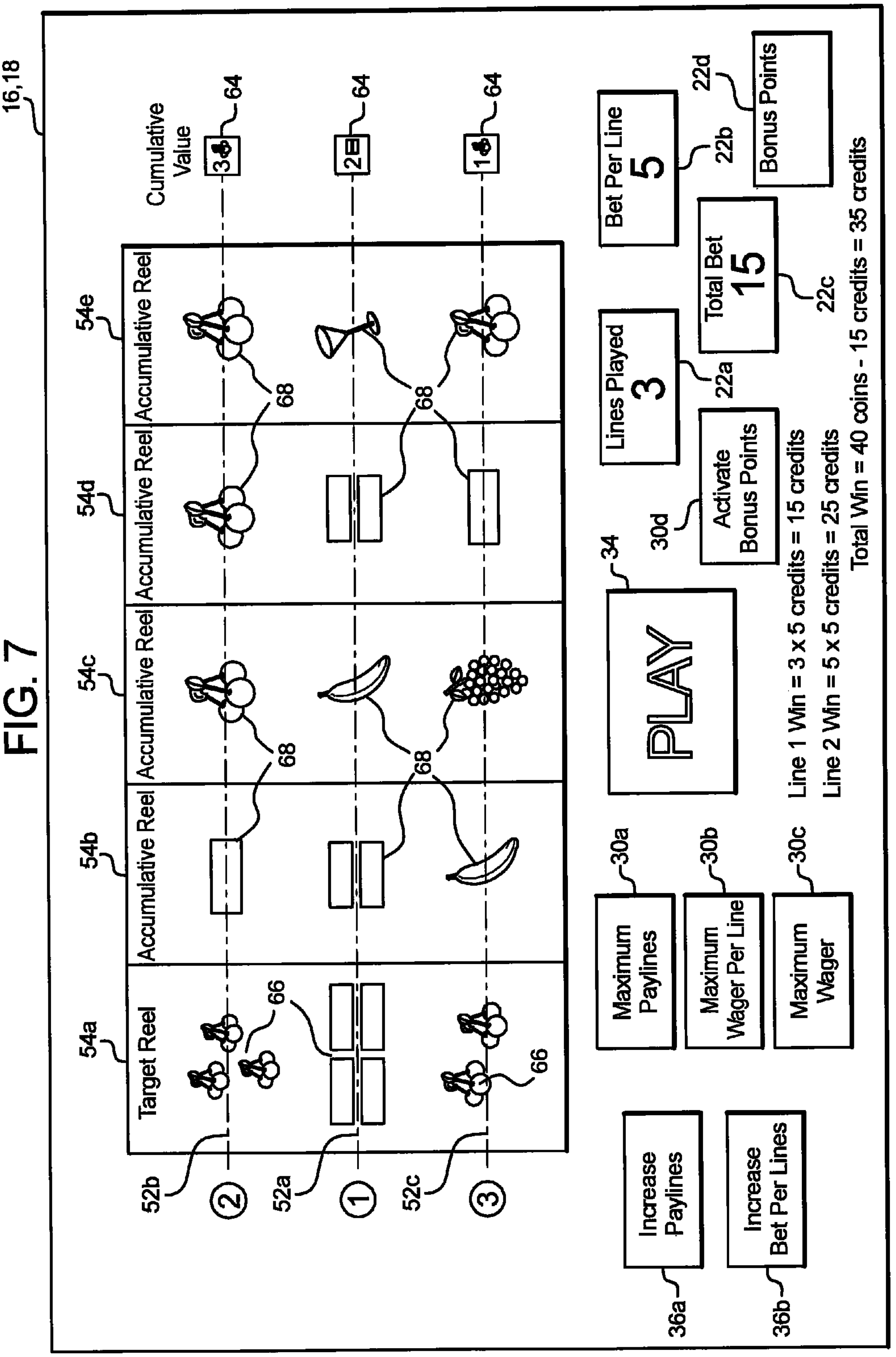
FIG. 7 is an elevation view of a display device of the gaming device illustrating another embodiment for the reel symbol evaluation apparatus and method.
Figure 8:
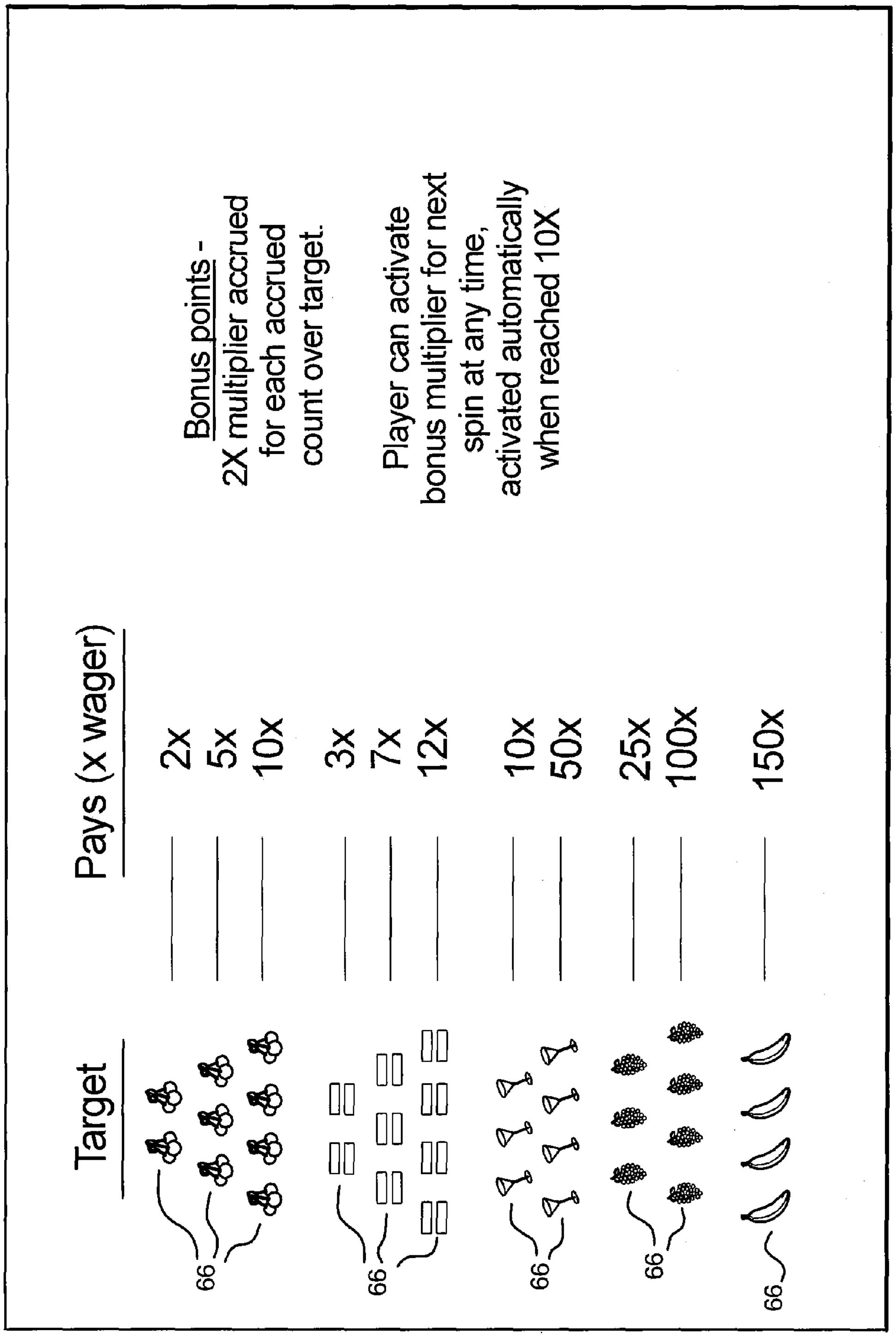
FIG. 8 is an elevation view of a display device of the gaming device illustrating one embodiment of a paytable for the reel symbol evaluation apparatus and method shown in FIG. 7.

Referring now to FIGS. 7 and 8, a further alternative embodiment for the symbol evaluation method and apparatus is illustrated. Display device 16 or 18 of FIG. 7 has many of the same apparatuses and features discussed above in connection with display device 16 or 18 of FIG. 5. In particular, display device 16 or 18 of FIG. 7 includes five reels 54*a* to 54*e*, three paylines 52*a* to 52*c*, wager inputs 30*a* to 30*c*, wager inputs 36*a* and 36*b*, play button 34, activate bonus points button 30*d*, bet displays 22*a* to 22*c* and bonus points display 22*d*.

Figure 11:
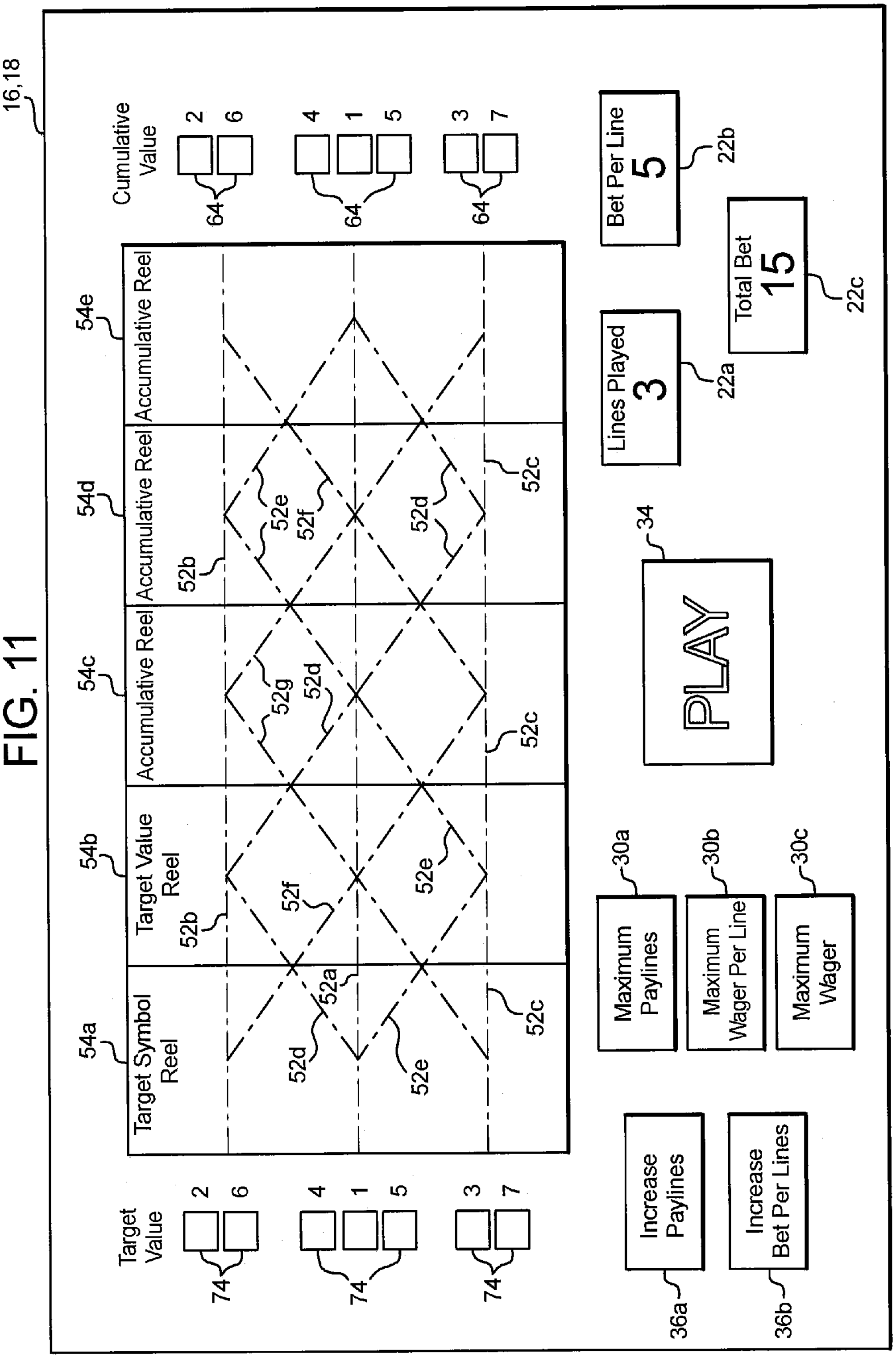
FIG. 11 is an elevation view of a display device of the gaming device illustrating various aspects for the reel symbol evaluation apparatuses and methods described herein.

In the embodiment of FIG. 7, the target reel is again reel 54*a*, while reels 54*b* to 54*e* are the accumulative reels. It should be appreciated that any reel can be set to be the target reel. As illustrated, target reel 54*a* spins and displays target symbols 66. Accumulative reels 54*b* to 54*e* spin and display accumulative symbols 68. Again, for the ease of illustration, three paylines 52 are provided. Target symbols 66 and accumulative symbols 68 are displayed along the three paylines 52*a* to 52*c*. In an alternative embodiment, any suitable amount of paylines 52 may be provided. FIG. 11 discussed below shows one embodiment for providing additional paylines 52.

As illustrated, target symbols 66 have two components or characteristics, namely, they each show which symbol needs to be matched and how many symbols need to be matched. For example, target symbol 66 along payline 52*a* shows that the target symbol for payline 52*a* is the double bar and that associated target value is two because two double bar symbols are shown. Likewise, target symbol 66 on reel 52*b* show that the designated symbol is the cherry symbol and that the associated target value is three because three cherry symbols are displayed at that reel stop position. Further, target symbols 66 of payline 52*c* shows that the target symbol is again the cherry symbol associated target value is two.

In one embodiment, the symbols on a plurality of the accumulative reels are the same. In another embodiment, the symbols on each of the accumulative reels are the same. In one embodiment, the symbols on a plurality of the accumulative reels are different. In another embodiment, the symbols on each of the accumulative reels are different. In different embodiments, the symbols on the accumulative reels are predetermined, randomly determined, determined based on the player's wager, determined based on the player's status (e.g., determined through a player tracking system), determined based on time, determined based on any side-bets placed, determined by the central controller, determined by the gaming device processor or determined based on any other suitable method.

In one embodiment, the symbols on a plurality of the target reels are the same. In another embodiment, the symbols on each target reel are the same. In one embodiment, the symbols on a plurality of the target reels are different. In another embodiment, the symbols on each of the target reels are different. In different embodiments, the symbols on the target reels are predetermined, randomly determined, determined based on the player's wager, determined based on the player's status (e.g., determined through a player tracking system), determined based on time, determined based on any side-bets placed, determined by the central controller, determined by the gaming device processor or determined based on any other suitable method.

As illustrated, the player has again played all three lines and wagered five credits on each line. The player has pressed the play button 34 and has generated the target symbols 66 and accumulative symbols 68 as shown on display device 16 or 18 of FIG. 7. As seen in the cumulative value meters 64 to the right of reel 54*e*, payline 52*a* has generated two accumulative bar symbols 68, payline 52*b* has generated three cherry symbols and payline 52*c* has generated one accumulative cherry symbol 68.

Assuming again that the mathematical threshold is that the cumulative value in meter 64 must meet or exceed the target value associated with the respective target symbol, the cumulative value of three cherries along payline 52*b* meets the threshold because the target value of symbol 66 of payline 52*a* is two cherries. Likewise, the cumulative value of three cherries along payline 52*b* meets such threshold because the target value of target symbol 66 of payline 52*b* is three cherries. The one cherry symbol generated at reel 54*e* and payline 52*c* does not meet the two cherry threshold of target symbol 66 at payline 52*c*.

FIG. 8 shows a paytable for the embodiment illustrated in connection with FIG. 7. As seen, the pays vary based on the type of symbol as well as how many symbols need to be accumulated. As seen, two cherries, three cherries, or four cherries pays 2×, 5× and 10×, respectively. Two double bars, three double bars and four double bars pay 3×, 7× and 12×, respectively. The player must generate three or four martini glasses to receive any pay. Two martini glasses would not yield an award. Three grapes and four grapes also pay, but not two grapes. And, only four bananas pay.

FIGS. 6 and 7 show that the player wins a 3× multiplier along payline 52*a* for achieving two double bars, which translates into a win along that line of fifteen credits. The player achieves a 5× multiplier along payline 52*b* for achieving three cherries, which in turn translates into a win along that line of twenty-five credits. The player's accumulated win is forty credits. The player's total win is forty credits less the wager or fifteen credits, or twenty-five credits.

As seen in FIG. 7, the player can again accrue bonus points. In meter 22*d*, the bonus points can be accrued via any of the methods discussed above in connection with FIGS. 5 and 6. As seen in the paytable of FIG. 8, the player obtains a 2× multiplier accrued for each accrued count or point over target. The player can activate the bonus multiplier for the next spin at any time. The game enables the player to accumulate up to a 10× multiplier before the game automatically executes the 10× multiplier on the next spin. The multiplier can multiply, for example, any one or more or all of the cumulative values along each payline.

Figure 9:
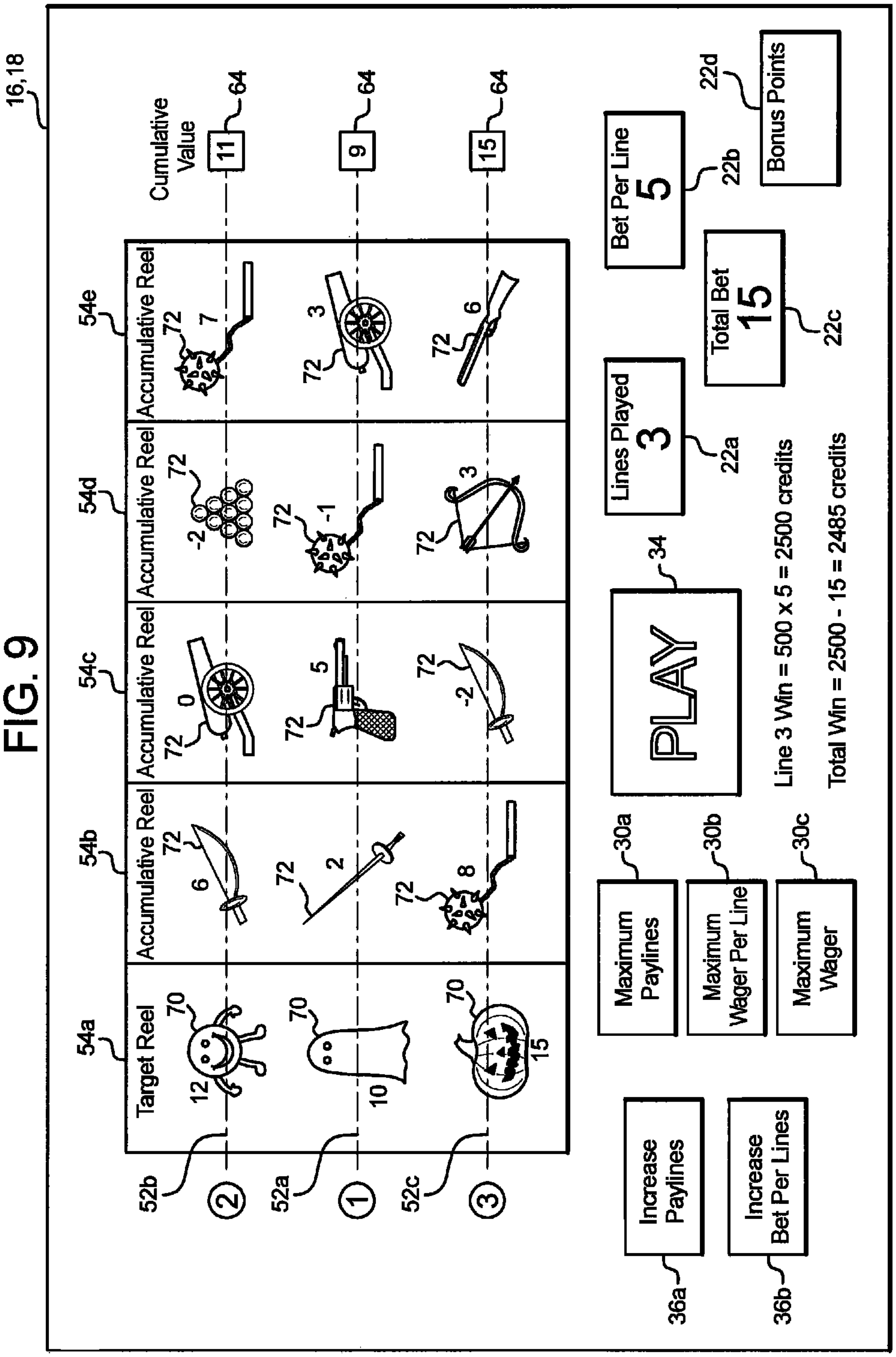
FIG. 9 is an elevation view of a display device of the gaming device illustrating a further embodiment for the reel symbol evaluation apparatus and method.
Figure 10:
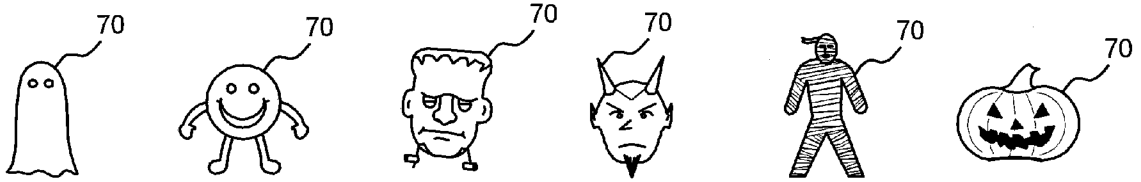
FIG. 10 is an elevation view of a display device of the gaming device illustrating one embodiment of a paytable for the reel symbol evaluation apparatus and method shown in FIG. 9.

Referring now to FIGS. 9 and 10, one embodiment of the reel symbol evaluation apparatus and method is illustrated. The embodiment of FIGS. 9 and 10 in certain respects is a combination of the previous two primary embodiments. As seen on the display device 16 or 18 of FIG. 9, this embodiment includes many of the same buttons, displays and apparatuses described above in connection with the other two primary embodiments. The description of those apparatuses applies equally to the like apparatuses shown in FIG. 9. Again, for purposes of convenience, only three paylines 52*a* to 52*c* are shown. More or less paylines may be employed alternatively.

As illustrated, reel 54*a* is the target reel, while reels 54*b* to 54*e* are the accumulative reels. Alternatively, one of the reels 54*b* to 54*e* is the target reel. Further alternatively, a plurality of reels 54 may be used to set the target symbol and value (see FIG. 11). The embodiment of FIGS. 9 and 10 is similar to that of FIGS. 5 and 6 in that values at the reel stop positions at target reel 54*a* are displayed. The embodiment of FIGS. 9 and 10 is also similar to that of FIGS. 7 and 8 because different target symbols 70 are employed.

The embodiment here is different in that each symbol, be it a target symbol 70 or an accumulative symbol 72, is associated with a value. The values of accumulative symbol 72 as before may be positive, negative, zero, multipliers or adders. The embodiment is also different from that of FIGS. 7 and 8 because the target symbols 70 here are from a different set of symbols than the accumulative symbols 72. Alternatively, target symbols 72 and accumulative symbols 70 can be generated from the same set or share indicia. Further, in the embodiment of FIGS. 7 and 8 only symbols corresponding to the target symbol are accumulated. In the embodiment of FIGS. 9 and 10, the values of each of the symbols generated along a payline on accumulative reels 54*b* to 54*e* are combined or summed to form the cumulative value associated with the payline, shown in the meters at the right of reel 54*e*.

As discussed in more detail below, each of the embodiments and in particular the embodiment of FIGS. 9 and 10 lends itself to interactive, fun and exciting displays. Those displays in an embodiment are made in accordance with a theme of the game. The theme of the game shown in connection with FIG. 9 is that the target values 70 represent monsters, while cumulative values 72 represent weapons or other apparatuses that could be used to destroy the monster. The values associated with the apparatuses are themed to indicate the potency of a particular weapon or other destructive tool, e.g., poison.

In FIG. 9, as before, the player has played all three paylines 52*a* to 52*c* and wagered five credits on each payline for a total bet of fifteen credits. The player has pressed play button 34 in FIG. 9 and has generated the illustrated target symbols 70 and accumulative symbols 72. Target symbol 70 along payline 52*a* and reel 54*a* has an associated value of ten, target symbol 70 along payline 52*b* has a target value of twelve, while target symbol 70 along payline 52*c* has a target value of fifteen. For ease of illustration, the mathematical threshold used in the illustrated embodiment is again that the accrued cumulative value must meet or exceed the associated target value. As seen, the cumulative value along payline 52*a* is two+five−one+three equaling nine shown in meter 64. The cumulative value of payline 52*b* is six+zero−two+seven, equaling eleven shown in meter 64. The cumulative value of payline 52*c* is eight−two+three+six, equaling fifteen shown in meter 64.

The cumulative value of nine for paytable 52*a* does not meet or exceed the target value of ten along payline 52*a*. The cumulative value of eleven along payline 52*b* also does not meet or exceed the target value of twelve along payline 52*b*. The cumulative value of fifteen along payline 52*c*, however, does meet the target value of fifteen associated with symbol 70 generated at reel 54*a*.

FIG. 10 illustrates an example paytable for the embodiment of FIGS. 9 and 10. The paytable shows each of the possible target symbols 70 or monsters that may appear on target reel 54*a*. As seen in this illustrated embodiment, the pays vary based on the target symbol 70 and also vary based on the target value. A separate paytable (not illustrated) may be provided to show the different accumulative symbols and possible associated values.

As seen in FIGS. 9 and 10, the player wins an award of 500× for achieving the target value of fifteen associated with the pumpkin monster 70 generated at reel 54*a* of payline 52*c*. The 500× award is multiplied by the five credits wagered along payline 52*c* to yield twenty-five hundred credits. The player's total win is twenty-five hundred credits less the fifteen credit wager or two thousand four hundred eighty five credits.

As seen in FIGS. 9 and 10, this embodiment can also yield bonus points, wherein, for example, one bonus point is accrued for each accrued count or point of the cumulative value over the target value. Alternatively, the bonus points are determined via any of the methods described herein. In the illustrated embodiment, the player does not decide when to activate or cash in the bonus points. Instead, a persistent bonus is activated automatically when one thousand bonus points are accrued. The persistent bonus doubles the total value along each payline for the next, e.g., 10 spins. It should be appreciated that the persistent bonus rewards the player for continuous gaming. Any of the scatter pay embodiments or methods described above are also applicable to the primary embodiment of FIGS. 9 and 10.

Referring now to FIG. 11, various alternative features applicable to each of the primary embodiments discussed herein are illustrated. Here, seven paylines 52*a* to 52*g* are employed. The diagonal paylines 52*d* to 52*g* are less intuitive to the player in terms of adding the resulting accumulative values. Accordingly, the cumulative value meters 64 shown at the end of reel 54*e* become the primary source for informing the player as to the result of the reel spin. For convenience, like target value meters can be displayed to the left of target reel 54*a* in meters 74. Even though the meters for paylines 2 and 6, for example, will show the same symbol, it may still be more clear to the player that the paystop at 54*a* along payline 52*b* also generating the target symbol shown at reel 54*a* for payline 52*f*. In one embodiment, the player's wager amount determines the number of paylines employed, thus the player's wager determines the number of accumulative value comparisons the processor performs. In this embodiment, the greater the player's wager, the greater the number of comparisons (according to different symbol patterns) the processor performs to determine the relationship of one or more of the cumulative values with one or more of the target values.

Another difference shown in FIG. 11 is that reels 54*a* and 54*b* are both used to determine the target symbol and its associated value. In particular, reel 54*a* as illustrated is the target symbol reel, while reel 54*b* is the target value reel. Here, the symbol and value for such symbol are generated independently. The remaining three reels 54*c* to 54*e* are the accumulative reels upon which symbols that are accumulated to form the cumulative symbol are generated. It should be appreciated that each of the embodiments described herein is operable with any suitable number of reels and is not limited to the five reels shown.

Referring now to FIG. 12, different suitable mathematical thresholds and an example game theme for each are illustrated. As discussed in each of the primary embodiments, one mathematical threshold suitable for use with each of the embodiments is whether the cumulative value is greater than or equal to the target value. Alternatively, the mathematical threshold may require that the cumulative value be greater than the target value.

As shown in connection with FIGS. 9 and 12, in one embodiment, the target values are monsters, the cumulative values represent weapons, warriors, potions or other items that do damage to the monster and accumulate potentially to destroy the monster. In an alternative theme example listed in FIG. 12, the target symbol is a mountain climber, the accumulative values represent steps up the mountain and accumulate potentially so that the mountain climber reaches the top of the mountain.

In another embodiment listed in FIG. 12, the mathematical threshold is whether the cumulative value is less than or less than or equal to the target value. Alternatively, the cumulative value may have to be less than the target value. In one example game theme, the target symbol is a weightlifter, the cumulative values represent weights added to a weight bar and add up potentially so that the total weight cannot be lifted.

In a further alternative embodiment listed in FIG. 12, the mathematical threshold is whether the cumulative value is within a range of the target value. In an example game theme the target symbol is a motorcycle daredevil, accumulative values represent lengths of travel during a jump and must accumulate to be within a certain range about the target so that the rider can land safely on the ramp.

In another alternative embodiment, the cumulative value must hit the target value exactly. Here, a sample game theme sets the target symbol as a basketball hoop or shot, cumulative values represent lengths of travel of a basketball shot and must accumulate to the target exactly for the ball to fall through the hoop.

It should be appreciated that the foregoing game themes lend themselves readily to fun and exciting reel symbol displays. For example, after the reels spin along each payline, the display device 16 or 18 could show a fight scene in which the monster is attacked by the various weapons, potions and the like and is either destroyed or not destroyed by the attacking weapons. Alternatively, the payline displays could show the mountain climber trying to reach the top of the mountain and either fail or succeed. Still further, the payline displays could show weightlifters as the weights are being loaded onto the bar either being able to lift the weight and win a prize or fail to lift the weight and not win a prize. In a further alternative payline display, different motorcycle jump sequences are shown, wherein the rider either lands or does not land safely on the ramp. Here, the range could correspond to the length of the ramp, such that the cumulative value falling within the range, but at the outside of the range, corresponds to the motorcycle landing at the front or rear edges respectively of the ramp. The cumulative value hitting the target value exactly on the other hand would be shown as the motorcycle rider landing in the center of the return ramp.

These few examples are not intended to limit the scope of the claims appended hereto in any manner. Instead, the examples show that the reel symbol evaluation method and apparatus described herein is readily adaptable to provide fun and exciting visual displays associated with reel spins, wherein the symbols interact according to a controlling game theme.

In one alternative embodiment, the present disclosure is employed is a gaming system with multiple gaming devices or machines to provide group or multi-player play of the game. In one such embodiment, one of the gaming machines generates the target values and the other gaming machines generate the accumulated values. In one such embodiment, if one gaming machine wins, all of the gaming machines provide awards to the players. In one embodiment, the gaming machine which generates the target value could depend on one or more factors. For instance, the gaming machine with the player that makes the highest wager could generate the target value. In other alternative embodiments, the target value generating gaming machine is: (1) alternated, (2) randomly determined, (3) based on the lowest wager, (4) rotated after a loss, (5) rotated after a win, (6) rotated after a tie, (7) based on the player playing the game for the longest period of time, (8) based on any combination of the above, (9) based on a players status (such as determined through a player tracking system), (10) based on any other suitable parameter or factor, or (11) based on a combination of any suitable of the above or other parameters or factors.

In further single player or multi-player embodiments, one or more instant wins or instant losses can be employed. For example, if a designated symbol is generated on a payline, an instant win is provided.

In further alternative embodiments, the accumulated reels can be purchased one at a time or in groups. For instance, for a first wager amount, the gaming machine provides an activation of the target value reel and an activation of one of the accumulated value reels (i.e., a total of two active reels). The comparison is done only based on the values generated on these two reels. If a second higher wager is placed, two accumulated value reels are activated and the comparison is based on those reels (i.e., a total of three active reels). If a third higher wager is placed, three accumulated value reels are activated and the comparison is based on those reels (i.e., a total of four active reels). If a fourth higher wager is placed, four accumulated value reels are activated and the comparison is based on those reels (i.e., a total of four active reels). In one such embodiment, the higher wagers have to be made per payline in a multi-payline game. For instance, to buy an extra accumulated value reel, the higher wager would include a larger wager on each of the paylines associated with that reel.

In a further embodiment, one or more of the symbols must be purchased to activate such symbols. For instance, one or more of the target symbols on the target reels can be purchased and one or more of the accumulated value symbols on the accumulated values reels can be purchased. In one such embodiment, different symbols can be purchased for different wager amounts. For example, a symbol associated with an accumulative value of 8 would require a higher wager amount to purchase than a symbol with an accumulative value of 2.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

at least one processor;

at least one display device;

at least one input device; and at least one memory device storing a plurality of instructions which, when executed by the at least one processor, cause the at least one processor to operate with the at least one display device and the at least one input device, for a play of a game associated with a plurality of different symbols, to:

(i) cause a spin of a target reel and a plurality of accumulative reels, the target reel including a plurality of the symbols and each of the accumulative reels including a plurality of the symbols, at least one of the symbols on each of the accumulative reels being the same as at least one of the symbols on the target reel;

(ii) designate one of the symbols using the target reel;

(iii) determine a number of times the designated symbol appears on the accumulative reels, said number not including a number of times the designated symbol appears on the target reel; and (iv) provide an award to a player based on the designated symbol and the determined number of times the designated symbol appears on the accumulative reels.

2. The gaming device of claim 1, wherein the designated symbol on the target reel and the accumulated designated symbols on the accumulative reels appear along a same payline.

3. The gaming device of claim 1, wherein the designated symbol on the target reel is associated with a target value and the accumulated designated symbols on the accumulative reels are associated with accumulative values, and wherein the plurality of instructions, when executed by the at least one processor, cause the at least one processor to add the accumulative values to form a cumulative value, compare the cumulative value to the target value, and provide the award to the player if the cumulative value meets a predefined mathematical threshold with respect to the target value.

4. The gaming device of claim 3, wherein the predefined mathematical threshold is of a type selected from the group consisting of:

(i) being greater than the target value;

(ii) being greater than or equal to the target value;

(iii) being less than the target value;

(iv) being less than or equal to the target value;

(v) being equal to the target value; and (vi) being within a range of the target value.

5. The gaming device of claim 3, wherein at least one of the accumulative values is:

(i) a multiplier used to multiply the accumulative value of at least one other accumulative symbols; or (ii) an increaser symbol used to increase the accumulative value of each of a plurality of other accumulative symbols.

6. A gaming device comprising:

at least one processor;

at least one display device;

at least one input device; and at least one memory device storing a plurality of instructions which, when executed by the at least one processor, cause the at least one processor to operate with the at least one display device and the at least one input device to:

(i) cause a spin of a target reel and a plurality of accumulative reels, the target reel including a plurality of target symbols each associated with a target value, at least two of the target symbols being different and at least two of the target values being different, each of the accumulative reels including a plurality of accumulative symbols configured to generate an accumulative value;

(ii) designate one of the generated target symbols associated with one of the target values using the target reel;

(iii) accumulate the accumulative values associated with the accumulative symbols appearing on the accumulative reels to form a cumulative value, said cumulative value not including the target value associated with the designated target symbol;

(iv) compare the cumulative value to the target value associated with the designated target symbol; and (v) provide an award to a player if the cumulative value meets a predefined mathematical threshold with respect to the target value associated with the designated target symbol.

7. The gaming device of claim 6, wherein the predefined mathematical threshold is of a type selected from the group consisting of:

(i) being greater than the target value associated with the designated target symbol;

(ii) being greater than or equal to the target value associated with the designated target symbol;

(iii) being less than the target value associated with the designated target symbol;

(iv) being less than or equal to the target value associated with the designated target symbol;

(v) being equal to the target value associated with the designated target symbol; and (vi) being within a range of the target value associated with the designated target symbol.

8. The gaming device of claim 6, wherein the designated target symbol and the accumulative symbols associated with the accumulated accumulative values appear along a same payline.

9. The gaming device of claim 6, wherein the award varies based on which of the target symbols is designated by the target reel.

10. The gaming device of claim 6, wherein at least one of the accumulative reels includes at least one of the target symbols.

11. The gaming device of claim 6, wherein the cumulative value is a sum of the generated accumulative values.

12. A gaming device comprising:

at least one processor;

at least one display device;

at least one input device; and at least one memory device storing a plurality of instructions which, when executed by the at least one processor, cause the at least one processor to operate with the at least one display device and the at least one input device to:

(a) generate and display a plurality of target symbols and a target value associated with each generated target symbol on a target reel;

(b) generate and display a plurality of accumulative symbols and an accumulative value associated with each generated accumulative symbol on each of a plurality of accumulative reels;

(c) designate one of the displayed target symbols using the target reel;

(d) accumulate the displayed accumulative values associated with the displayed accumulative symbols to form a cumulative value;

(e) compare the cumulative value to the displayed target value associated with the designated target symbol; and (f) provide an award to a player if the cumulative value meets a predefined mathematical threshold with respect to the displayed target value associated with the designated target symbol.

13. The gaming device of claim 12, wherein the predefined mathematical threshold is of a type selected from the group consisting of:

(i) being greater than the displayed target value associated with the designated target symbol;

(ii) being greater than or equal to the displayed target value associated with the designated target symbol;

(iii) being less than the displayed target value associated with the designated target symbol;

(iv) being less than or equal to the displayed target value associated with the designated target symbol;

(v) being equal to the displayed target value associated with the designated target symbol; and (vi) being within a range of the displayed target value associated with the designated target symbol.

14. The gaming device of claim 12, wherein the designated target symbol and the displayed accumulative symbols associated with the accumulated accumulative values appear along a same payline.

15. The gaming device of claim 12, wherein the award varies based on which of the displayed target symbols is designated by the target reel.

16. The gaming device of claim 12, wherein at least one of the accumulative reels includes at least one of the target symbols.

17. The gaming device of claim 12, wherein the cumulative value is a sum of the displayed accumulative values.

* * * * *

UNITED STATES PATENT AND TRADEMARK OFFICE

CERTIFICATE OF CORRECTION

PATENT NO. : 8,491,375 B2
APPLICATION NO. : 13/028822
DATED : July 23, 2013
INVENTOR(S) : Michael Neil Low It is certified that error appears in the above-identified patent and that said Letters Patent is hereby corrected as shown below:

IN THE CLAIMS

In Claim 5, Column 28, Line 58, replace “accumulative” with --accumulated designated--.
In Claim 5, Column 28, Line 58, replace “symbols” with --symbol--.
In Claim 5, Column 28, Line 60, replace “accumulative” with --accumulated designated--.

Signed and Sealed this
Fifteenth Day of April, 2014

Michelle K. Lee

Michelle K. Lee
*Deputy Director of the United States Patent and Trademark Office*